United States Patent
Callard et al.

(10) Patent No.: US 12,207,262 B2
(45) Date of Patent: Jan. 21, 2025

(54) UPLINK CONTROL INFORMATION (UCI) COORDINATION FOR DISTRIBUTED CARRIER AGGREGATION (CA) SCHEDULING

(71) Applicant: Telefonaktiebolaget LM Ericsson (publ), Stockholm (SE)

(72) Inventors: Aaron Callard, Ottawa (CA); Hong Ren, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 569 days.

(21) Appl. No.: 17/610,556

(22) PCT Filed: May 15, 2019

(86) PCT No.: PCT/IB2019/054045
§ 371 (c)(1),
(2) Date: Nov. 11, 2021

(87) PCT Pub. No.: WO2020/229879
PCT Pub. Date: Nov. 19, 2020

(65) Prior Publication Data
US 2022/0232606 A1    Jul. 21, 2022

(51) Int. Cl.
*H04W 72/21* (2023.01)
*H04L 5/00* (2006.01)
*H04W 72/1273* (2023.01)

(52) U.S. Cl.
CPC ......... *H04W 72/21* (2023.01); *H04L 5/0092* (2013.01); *H04W 72/1273* (2013.01)

(58) Field of Classification Search
CPC .................... H04W 72/21; H04W 72/1273
See application file for complete search history.

(56) References Cited

U.S. PATENT DOCUMENTS

| 9,888,513 B2 | 2/2018 | Iyer et al. | |
| 2014/0177555 A1* | 6/2014 | Ng | H04L 5/0044 370/329 |

(Continued)

FOREIGN PATENT DOCUMENTS

WO    2018/141246 A1    8/2018

OTHER PUBLICATIONS

Invitation to Pay Additional Fees dated Feb. 12, 2020 issued in PCT Application No. PCT/IB2019/054045, consisting of 13 pages.

(Continued)

*Primary Examiner* — Basil Ma
(74) *Attorney, Agent, or Firm* — Sage Patent Group

(57) ABSTRACT

Apparatuses and methods for uplink control information (UCI) coordination for distributed carrier aggregation (CA) scheduling are provided. In some embodiments, a method in a first scheduler node of a first cell is provided that comprises receiving data for a wireless device (WD), the data to be scheduled for transmission to the WD in a second cell; transferring the data to a second scheduler node for scheduling transmission of the data in the second cell; and, as a result of the transfer of the data, receiving a scheduling decision from the second scheduler node, the received scheduling decision scheduling the transmission of at least a portion of the data to the WD in at least one physical downlink channel in the second cell.

20 Claims, 16 Drawing Sheets

(56) References Cited

U.S. PATENT DOCUMENTS

| | | | |
|---|---|---|---|
| 2017/0135039 A1* | 5/2017 | Takeda | H04L 5/0048 |
| 2018/0124851 A1* | 5/2018 | Iyer | H04W 28/12 |
| 2019/0081722 A1* | 3/2019 | Takeda | H04L 5/0048 |
| 2020/0008231 A1* | 1/2020 | Vilaipornsawai | H04W 72/21 |

OTHER PUBLICATIONS

International Search Report and Written Opinion dated Apr. 6, 2020 issued in PCT Application No. PCT/IB2019/054045, consisting of 17 pages.
3GPP TS 38.213 V15.5.0 (Mar. 2019); 3rd Generation Partnership Project; Technical Specification Group Radio Access Network; NR; Physical Layer Procedures for Control (Release 15), consisting of 104 pages.

* cited by examiner

| Label | Data Duplication Buffer | | Scheduling |
|---|---|---|---|
| Xn based CA | No | Single | Central |
| ERAN based CA | | | Distributed |
| Xn based CA with Remote Buffers | | Multiple | Central |
| High level RLC split | Yes | | Distributed |
| Xn based CA, data pretransfer | | Multiple | Central |

FIG. 6

| Notable features | Prescheduling Requirement |
|---|---|
| ERAN based | 2*Delay |
| ERAN with pre-data transfer<br>Heuristic data load balancing algorithm | 1* delay or 0 depending on DAI treatment |
| Xn Based<br>Requires heuristic resource release algorithm | 1* delay |

FIG. 11

| Amount of high priority Traffic | Latency Impacts | Limitations |
|---|---|---|
| ACK/NACK, buffer maintenance messages <1 K per user | Average latency increases HARQ RTT | ACK/NACK delays are increased by 0.5 a slot Decoding of PUSCH can be delayed |

FIG. 16

UPLINK CONTROL INFORMATION (UCI) COORDINATION FOR DISTRIBUTED CARRIER AGGREGATION (CA) SCHEDULING

CROSS-REFERENCE TO RELATED APPLICATIONS

This application is a Submission Under 35 U.S.C. § 371 for U.S. National Stage Patent Application of International Application Number: PCT/IB2019/054045, filed May 15, 2019 entitled "UPLINK CONTROL INFORMATION (UCI) COORDINATION FOR DISTRIBUTED CARRIER AGGREGATION (CA) SCHEDULING," the entirety of which is incorporated herein by reference.

TECHNICAL FIELD

Wireless communication and in particular, uplink control information (UCI) coordination for distributed carrier aggregation (CA) scheduling.

BACKGROUND

Much of concurrent traffic in modern $3^{rd}$ Generation Partnership Project (3GPP) networks is mobile Internet-centric, and is uplink (UL) triggered. For example, an application or "app" in a wireless device (WD) may send a small-sized data request over the 3GPP network meant to trigger a download of a much larger-sized content from an Internet server. When such request occurs, there may be a momentary use of large chunks of communication resources; while on the other hand there may be a substantial amount of idle time in between such requests.

Thus, 3GPP has defined Carrier Aggregation (CA), which as the name implies, combines the capacity of many bands and carriers that can simultaneously be used towards one user (e.g., user WD) to achieve greater data throughput. The CA may be defined and controlled in a way that decouples the aggregation of downlink (DL) resources from an aggregation of UL resources to fit the user with respect to the associated amount of data in each direction, e.g., as discussed above.

In Carrier Aggregation (CA), two or more carriers may be aggregated, each of such aggregated carriers provided as a serving cell. A WD may simultaneously receive, or transmit on one or multiple carriers depending on the WD's capabilities. CA is supported for both contiguous and non-contiguous carriers. When CA is deployed, frame timing and System Frame Number (SFN) are generally aligned across cells that can be aggregated.

Although, when CA is configured, the WD may be connected with many servings cells, the serving cells may be jointly handled by one and the same radio resource control (RRC) connection. At establishment/re-establishment/handover, one of the serving cells provides Non-Access Stratum (NAS) anchor information, and at re-establishment or handover, the same one serving cell provides the security input. This cell is generally referred to as the Primary Cell (PCell). Secondary Cells (SCells) form, together with the PCell, a set of serving cells. The configured set of serving cells for a WD therefore includes one PCell and one or more SCells.

The network may use RRC to add or remove SCells. When adding a new SCell, dedicated RRC signaling is used for sending all required system information of the SCell. While in connected mode, WDs may not need to acquire broadcast system information directly from the SCells.

Upon configuration of an added SCell in the layers below RRC, the SCell may be deactivated. The network may use the Medium Access Control (MAC) Control Element (CE) to activate and deactivate the configured SCells. If the SCell is deactivated the WD may not monitor the Physical Downlink Control Channel (PDCCH) on the SCell, or for the SCell. In addition, the WD may not be required to transmit reference signals, or channel estimates to support scheduling with adaptive modulation and coding.

When the WD receives a MAC CE activating an SCell, the WD applies normal SCell operation including PDCCH monitoring on the SCell and for the SCell, and the transmission of reference signals and channel estimates to support scheduling decisions. The PDCCH performs scheduling of the WD on the downlink shared channel (DL-SCH or PDSCH) and on the uplink shared channel (UL-SCH or PUSCH). These are facts that the MAC sublayer of the network may relate to.

However, coordinating scheduling and buffer treatment among distributed network nodes (e.g., baseband units in distributed radio access network (DRAN) when performing CA may be problematic.

SUMMARY

Some embodiments advantageously provide methods and apparatuses for e.g., reducing the impact of backhaul delay when coordinating UCI for distributed CA scheduling.

According to a first aspect of the present disclosure, a first scheduler node of a first cell is configured to communicate with a second scheduler node of a second cell and the first scheduler node is configured to perform scheduling for a wireless device, WD, in the first cell of a communication system with carrier aggregation. The first scheduler node comprises processing circuitry. The processing circuitry is configured to receive data for the WD, the data to be scheduled for transmission to the WD in the second cell. The processing circuitry is configured to transfer the data to the second scheduler node for scheduling transmission of the data in the second cell. The processing circuitry is configured to, as a result of the transfer of the data, receive a scheduling decision from the second scheduler node, the received scheduling decision scheduling the transmission of at least a portion of the data to the WD in at least one physical downlink channel in the second cell.

In some embodiments of this aspect, the processing circuitry is further configured to receive the scheduling decision by being configured to receive the scheduling decision after the transfer of the data to the second scheduler node. In some embodiments of this aspect, the processing circuitry is further configured to receive the scheduling decision by being configured to receive the scheduling decision as a result of the transfer of the data to the second scheduler node. In some embodiments of this aspect, the at least one downlink channel is configured according to the scheduling decision of the second scheduler node. In some embodiments of this aspect, the at least one physical downlink channel is a physical downlink shared channel, PDSCH. In some embodiments of this aspect, the scheduling decision includes scheduling information for the at least one downlink channel in the second cell, the scheduling information including downlink control information, DCI. In some embodiments of this aspect, the first scheduler node is configured to communicate with the second scheduler node via a backhaul link for independent scheduling of the WD in carrier aggregation mode with coordinated uplink control information, UCI. In some embodiments of this aspect, the processing circuitry is further configured to transfer the data by being configured to transfer the data from the first scheduler node to the second scheduler node via a backhaul link. In some embodiments of this aspect, the processing circuitry is further configured to transfer the data by being configured to transfer the data from the first scheduler node to the second scheduler node via an X2 interface. In some embodiments of this aspect, the second cell is an external cell, Escell, relative to the first cell. In some embodiments of this aspect, the processing circuitry is further configured to receive uplink control information, UCI, on orthogonal UCI resources, the orthogonal UCI resources comprising a first set of UCI resources for the first cell and a second set of UCI resources for the second cell, the first set of UCI resources not overlapping the second set of UCI resources. In some embodiments of this aspect, each set of UCI resources is a set of non-overlapping subframes. In some embodiments of this aspect, the first scheduler node and the second scheduler node are Medium Access Control, MAC, schedulers.

According to another aspect of the present disclosure, a second scheduler node of a second cell is configured to communicate with a first scheduler node of a first cell. The second scheduler node is configured to perform scheduling for a wireless device, WD, in the second cell of a communication system with carrier aggregation. The second scheduler node comprises processing circuitry. The processing circuitry is configured to receive data for the WD from the first scheduler node, the data to be scheduled for transmission to the WD in the second cell. The processing circuitry is configured to, as a result of receiving the data, determine a scheduling decision, the scheduling decision scheduling the transmission of at least a portion of the data to the WD in at least one physical downlink channel in the second cell. The processing circuitry is configured to transmit the scheduling decision to the first scheduler node.

In some embodiments of this aspect, the processing circuitry is further configured to transmit the at least the portion of the data to the WD in the at least one physical downlink channel in the second cell. In some embodiments of this aspect, the processing circuitry is further configured to determine the scheduling decision by being configured to determine the scheduling decision after the data is received from the first scheduler node. In some embodiments of this aspect, the processing circuitry is further configured to determine the scheduling decision by being configured to determine the scheduling decision in response to receiving the data from the first scheduler node. In some embodiments of this aspect, the processing circuitry is further configured to configure the at least one downlink channel according to the scheduling decision of the second scheduler node. In some embodiments of this aspect, the at least one physical downlink channel is a physical downlink shared channel, PDSCH. In some embodiments of this aspect, the scheduling decision includes scheduling information for the at least one downlink channel in the second cell, the scheduling information including downlink control information, DCI. In some embodiments of this aspect, the second scheduler node is configured to communicate with the first scheduler node via a backhaul link for independent scheduling of the WD in carrier aggregation mode with coordinated uplink control information, UCI. In some embodiments of this aspect, the processing circuitry is further configured to receive the data by being configured to receive the data from the first scheduler node via a backhaul link. In some embodiments of this aspect, the processing circuitry is further configured to receive the data by being configured to receive the data from the first scheduler node via an X2 interface. In some embodiments of this aspect, the second cell is an external cell, Escell, relative to the first cell. In some embodiments of this aspect, the processing circuitry is further configured to receive uplink control information, UCI, on orthogonal UCI resources, the orthogonal UCI resources comprising a first set of UCI resources for the first cell and a second set of UCI resources for the second cell, the first set of UCI resources not overlapping the second set of UCI resources. In some embodiments of this aspect, each set of UCI resources is a set of non-overlapping subframes. In some embodiments of this aspect, the first scheduler node and the second scheduler node are Medium Access Control, MAC, schedulers.

According to another aspect of the present disclosure, a first scheduler node configured to perform scheduling for a wireless device, WD, in a first cell is provided, the first scheduler node comprising processing circuitry and the processing circuitry is configured to receive data via a physical uplink channel, the physical uplink channel including uplink control information, UCI. The processing circuitry is configured to determine whether the UCI is triggered by a second scheduler node, the second scheduler node configured to perform scheduling for the WD in a second cell. The processing circuitry is configured to, in response to determining that the UCI is triggered by the second scheduler node, demodulate and store the received data in a buffer. The processing circuitry is configured to, in response to receiving an indication of a number of bits in the UCI from the second scheduler node, retrieve the data from the buffer and decode the data using the indication.

In some embodiments of this aspect, the physical uplink channel is one of a physical uplink shared channel, PUSCH, and a physical uplink control channel, PUCCH. In some embodiments of this aspect, the UCI is triggered by the second scheduler node based on the second scheduler node scheduling downlink transmissions in the second cell, the downlink transmissions triggering hybrid-automatic repeat request, HARQ, feedback in the UCI. In some embodiments of this aspect, the second cell is different from the first cell. In some embodiments of this aspect, the processing circuitry is further configured to decode the UCI using the indication and transmit the UCI to the second scheduler node. In some embodiments of this aspect, the processing circuitry is further configured to receive the indication of the number of bits in the UCI in a message from the second scheduler node.

According to yet another aspect of the present disclosure, a method for a first scheduler node of a first cell configured to communicate with a second scheduler node of a second cell is provided. The first scheduler node is configured to perform scheduling for a wireless device, WD, in the first cell of a communication system with carrier aggregation. The method comprises receiving data for the WD, the data to be scheduled for transmission to the WD in the second cell. The method comprises transferring the data to the second scheduler node for scheduling transmission of the data in the second cell. The method comprises, as a result of the transfer of the data, receiving a scheduling decision from the second scheduler node, the received scheduling decision scheduling the transmission of at least a portion of the data to the WD in at least one physical downlink channel in the second cell.

In some embodiments of this aspect, the receiving the scheduling decision further comprises receiving the scheduling decision after the transfer of the data to the second scheduler node. In some embodiments of this aspect, the receiving the scheduling decision further comprises receiving the scheduling decision as a result of the transfer of the data to the second scheduler node. In some embodiments of this aspect, the method further comprises configuring the at least one downlink channel according to the scheduling decision of the second scheduler node. In some embodiments of this aspect, the at least one physical downlink channel is a physical downlink shared channel, PDSCH. In some embodiments of this aspect, the scheduling decision includes scheduling information for the at least one downlink channel in the second cell, the scheduling information including downlink control information, DCI. In some embodiments of this aspect, the second scheduler node is configured to communicate with the first scheduler node via a backhaul link for independent scheduling of the WD in carrier aggregation mode with coordinated uplink control information, UCI. In some embodiments of this aspect, the transferring the data to the second scheduler node is via a backhaul link. In some embodiments of this aspect, the transferring the data to the second scheduler node is via an X2 interface. In some embodiments of this aspect, the second cell is an external cell, Escell, relative to the first cell. In some embodiments of this aspect, the method further comprises receiving uplink control information, UCI, on orthogonal UCI resources, the orthogonal UCI resources comprising a first set of UCI resources for the first cell and a second set of UCI resources for the second cell, the first set of UCI resources not overlapping the second set of UCI resources. In some embodiments of this aspect, each set of UCI resources is a set of non-overlapping subframes. In some embodiments of this aspect, the first scheduler node and the second scheduler node are MAC schedulers.

According to another aspect of the present disclosure, a method for a second scheduler node of a second cell configured to communicate with a first scheduler node of a first cell is provided. The second scheduler node is configured to perform scheduling for a wireless device, WD, in the second cell of a communication system with carrier aggregation. The method comprises receiving data for the WD from the first scheduler node, the data to be scheduled for transmission to the WD in the second cell. The method comprises, as a result of receiving the data, determining a scheduling decision, the scheduling decision scheduling the transmission of at least a portion of the data to the WD in at least one physical downlink channel in the second cell. The method comprises transmitting the scheduling decision to the first scheduler node.

In some embodiments of this aspect, the method further comprises transmitting the at least the portion of the data to the WD in the at least one physical downlink channel in the second cell. In some embodiments of this aspect, the determining the scheduling decision further comprises determining the scheduling decision after the data is received from the first scheduler node. In some embodiments of this aspect, the determining the scheduling decision further comprises determining the scheduling decision in response to receiving the data from the first scheduler node. In some embodiments of this aspect, the method further comprises configuring the at least one downlink channel according to the scheduling decision of the second scheduler node. In some embodiments of this aspect, the at least one physical downlink channel is a physical downlink shared channel, PDSCH. In some embodiments of this aspect, the scheduling decision includes scheduling information for the at least one downlink channel in the second cell, the scheduling information including downlink control information, DCI. In some embodiments of this aspect, the first scheduler node is configured to communicate with the second scheduler node via a backhaul link for independent scheduling of the WD in carrier aggregation mode with coordinated uplink control information, UCI. In some embodiments of this aspect, the receiving the data further comprises receiving the data from the first scheduler node via a backhaul link. In some embodiments of this aspect, the receiving the data further comprises receiving the data from the first scheduler node via an X2 interface. In some embodiments of this aspect, the second cell is an external cell, Escell, relative to the first cell. In some embodiments of this aspect, the method further comprises receiving uplink control information, UCI, on orthogonal UCI resources, the orthogonal UCI resources comprising a first set of UCI resources for the first cell and a second set of UCI resources for the second cell, the first set of UCI resources not overlapping the second set of UCI resources. In some embodiments of this aspect, each set of UCI resources is a set of non-overlapping subframes. In some embodiments of this aspect, the first scheduler node and the second scheduler node are MAC schedulers.

According to another aspect of the present disclosure, a method for a first scheduler node configured to perform scheduling for a wireless device, WD, in a first cell is provided. The method comprises receiving data via a physical uplink channel, the physical uplink channel including uplink control information, UCI. The method comprises determining whether the UCI is triggered by a second scheduler node, the second scheduler node configured to perform scheduling for the WD in a second cell. The method comprises, in response to determining that the UCI is triggered by the second scheduler node, demodulating and storing the received data in a buffer. The method comprises, in response to receiving an indication of a number of bits in the UCI from the second scheduler node, retrieving the data from the buffer and decoding the data using the indication.

In some embodiments of this aspect, the physical uplink channel is one of a physical uplink shared channel, PUSCH, and a physical uplink control channel, PUCCH. In some embodiments of this aspect, the UCI is triggered by the second scheduler node based on the second scheduler node scheduling downlink transmissions in the second cell, the downlink transmissions triggering hybrid-automatic repeat request, HARQ, feedback in the UCI. In some embodiments of this aspect, the second cell is different from the first cell. In some embodiments of this aspect, the method further comprises decoding the UCI using the indication and transmitting the UCI to the second scheduler node. In some embodiments of this aspect, the receiving the indication of the number of bits in the UCI further comprises receiving the indication in a message from the second scheduler node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 illustrates some combinations of different main concepts involved in distributed CA scheduling;

FIG. 11 illustrates a comparison chart of features of existing ERAN, existing Xn and ERAN with pre-data transfer according to one embodiment of the present disclosure;

FIG. 16 illustrates an example of the impacts of latency according to some embodiments of the present disclosure.

DETAILED DESCRIPTION

Figure 1:
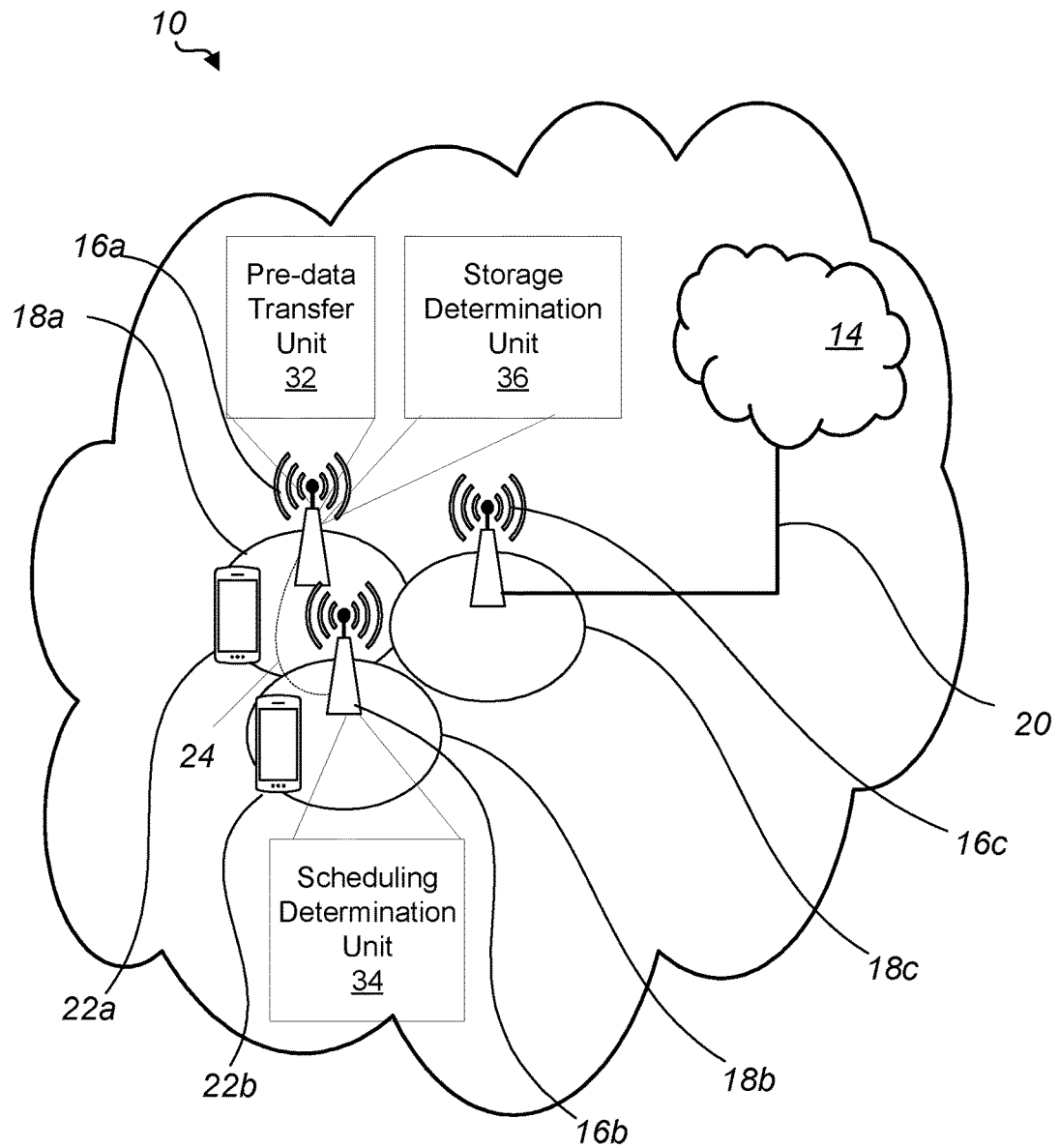
FIG. 1 is a schematic diagram of an exemplary network architecture illustrating a communication system according to the principles in the present disclosure.

Some embodiments of the present disclosure provide techniques for coordinated scheduling and/or buffer treatment among distributed scheduler nodes (e.g., distributed baseband units) with additional functions to relax the requirements on the backhaul transport between such scheduler nodes (e.g., baseband units).

Some embodiments of the present disclosure attempt to reduce the impact of backhaul delay when performing carrier aggregation across a delayed backhaul.

Some embodiments of the present disclosure enable nodes which are far apart (according to backhaul communication such as by distance, hops, links, speed, delay, etc.) to act towards to the WD in CA mode as a single entity.

Unfortunately, current solutions for coordinating scheduling among distributed scheduler nodes require data to be sent with a very low delay budget, which causes poor utilization and limits the applicability of solutions.

Additionally, some current solutions suffer from poor performance due to a centralized scheduling architecture.

Accordingly, some embodiments of the present disclosure provide one or more techniques to solve the problems of e.g., scheduling in distributed scheduler nodes for CA and/or backhaul delays associated therewith. Some embodiments may include one or more of the following features:

1) Implement (transparently to the WD) an upper layer Radio Link Control (RLC) split; and/or
2) Make independent scheduling decisions at each of the remote nodes (e.g., 2 or more remote scheduler nodes) using one or more of the following features to allow for the UL messages to be well-coordinated (as explained in more detail below):
   a. Use orthogonal resources (e.g., different transmission time intervals (TTIs) for each scheduler node);
   b. Store and decode later (e.g., store UL data received at a node via e.g., a Pcell, where the data is to be decoded at a later time, such as, when additional information required for decoding arrives at the node); and/or
   c. Send copies of data (e.g., data to be scheduled, such as, in the DL, by a remote node) to the remote node ahead of the remote node's scheduling decisions.

Using one or more of these techniques, Carrier Aggregation may be implemented over larger latency backhaul links in a more efficient manner, as compared to existing techniques.

Some embodiments of the present disclosure provide for one or more of the following techniques:

1) Implement CA over multiple nodes using an RLC split;
2) Coordinating uplink control information (UCI) resources through orthogonal resources (e.g., TTIs) assigned for each node/cell;
3) Sending data to be scheduled to a scheduling node before scheduling; and/or
4) Storing received signals until remote scheduling decisions can be made available to the receiver (e.g., UL radio receiver), and then decoding the stored signals.

Before describing in detail exemplary embodiments, it is noted that the embodiments reside primarily in combinations of apparatus components and processing steps related to UCI coordination for distributed CA scheduling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "scheduler node" used herein can be any kind of network node comprised in a radio network which may further comprise any of scheduler node, baseband unit, base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), self-organizing network (SON) node, a coordinating node, nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or one or two scheduler nodes may be distributed over a plurality of wireless devices and/or scheduler nodes. In other words, it is contemplated that the functions of the scheduler node and wireless device described herein are not limited to performance by a single physical device and, in fact, can be distributed among several physical devices.

In some embodiments, the terms "second cell," "Scell," "Escell" and/or "secondary cell" may be used herein interchangeably. In some embodiments, the terms "first cell," "Pcell" and/or "primary cell" may be used herein interchangeably.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of scheduler nodes 16a, 16b, 16c (referred to collectively as scheduler nodes 16), such as NBs, eNBs, gNBs or other types of wireless access points, each defining a corresponding cell 18a, 18b, 18c (referred to collectively as cells 18 or serving cells 18). Each scheduler node 16a, 16b, 16c is connectable to the core network 14 over a wired or wireless connection 20 (which may or may not include a backhaul link). Each scheduler node 16a, 16b, 16c may be connectable to one another via a backhaul link 24, which may include at least a wired connection. In some embodiments, the backhaul link 24 may include an X2 interface or X2* interface, or other type of interface associated with the backhaul. In some embodiments, the techniques in this disclosure may be configured to reduce the impact of backhaul delay when performing CA with two or more remote scheduler nodes 16 separated via the backhaul link 24. In some embodiments, the connection 20 to the core network 14 may include a backhaul link 24 over which remote scheduler nodes 16 may communicate with one another using one or more of the techniques disclosed herein.

A first wireless device (WD) 22a located in cell 18a is configured to wirelessly connect to, or be paged by, the corresponding scheduler node 16a. A second WD 22b in a second cell 18b is wirelessly connectable to the corresponding scheduler node 16b. In some embodiments, such as for CA, the cells 18 may be serving cells, where, for example, one cell 18a may be a Pcell and at least one or more other cells 18b, 18c may be an Scell. While a plurality of WDs 22a, 22b (collectively referred to as wireless devices 22) are illustrated in this example, the disclosed embodiments are equally applicable to a situation where a sole WD is in the cell or where a sole WD is connecting to the corresponding scheduler node 16. Note that although only two WDs 22 and three scheduler nodes 16 are shown for convenience, the communication system 10 may include many more WDs 22 and many more scheduler nodes 16. In some embodiments, each scheduler node 16 may be configured to coordinate UCI for CA scheduling according to one or more of the techniques disclosed herein.

It is contemplated that a WD 22 can be in simultaneous communication and/or configured to separately communicate with more than one scheduler node 16 and more than one type of scheduler node 16. For example, a WD 22 can have dual connectivity with a scheduler node 16 that supports LTE and the same or a different scheduler node 16 that supports NR. As an example, WD 22 can be in communication with an eNB for LTE/E-UTRAN and a gNB for NR/NG-RAN. In addition or alternatively, WD 22 in CA mode can receive DL communications from one scheduler node 16 via one carrier and receive UL communications from another scheduler node 16 via a different carrier according to CA.

A scheduler node 16a of a first cell 18a comprises a pre-data transfer unit 32 which is configured to receive data for the WD 22, the data to be scheduled for transmission to the WD 22 in a second cell 18b. The pre-data transfer unit 32 is configured to transfer the data to the second scheduler node 16b for scheduling transmission of the data in the second cell 18b. The pre-data transfer unit 32 is configured to, as a result of the transfer of the data, receive a scheduling decision from the second scheduler node 16b, the received scheduling decision scheduling the transmission of at least a portion of the data to the WD 22 in at least one physical downlink channel in the second cell 18b.

A scheduler node 16b of a second cell 18b comprises a scheduling determination unit 34 which is configured to receive data for the WD 22 from the first scheduler node 16a, the data to be scheduled for transmission to the WD 22 in the second cell 18b. The scheduling determination unit 34 is configured to, as a result of receiving the data, determine a scheduling decision, the scheduling decision scheduling the transmission of at least a portion of the data to the WD 22 in at least one physical downlink channel in the second cell 18b. The scheduling determination unit 34 is configured to transmit the determined scheduling decision to the first scheduler node 16a.

A scheduler node 16a of a first cell 18a comprises a storage determination unit 36 which is configured to receive data via a physical uplink channel, the physical uplink channel including uplink control information, UCI. The storage determination unit 36 is configured to determine whether the UCI is triggered by a second scheduler node 16b, the second scheduler node 16b configured to perform scheduling for the WD 22 in a second cell 18b. The storage determination unit 36 is configured to, in response to determining that the UCI is triggered by the second scheduler node 16b, demodulate and store the received data in a buffer. The storage determination unit 36 is configured to, in response to receiving an indication of a number of bits in the UCI from the second scheduler node 16b, retrieve the data from the buffer and decode the data using the indication.

Example implementations, in accordance with an embodiment, of the WD 22 and the scheduler node 16 discussed in the preceding paragraphs will now be described with reference to FIG. 2. In a communication system 10, a scheduler node 16a provided in a communication system 10 and including hardware 60 enabling it to communicate with the WD 22. The hardware 60 may include a communication interface 62. The communication interface 62 may be configured for setting up and maintaining a wired or wireless connection with an interface of a different communication device of the communication system 10, such as scheduler node 16b, over e.g., a backhaul link 24. The communication interface 62 may be configured to include a radio interface for setting up and maintaining at least a wireless connection with a WD 22 located in a cell 18 served by the scheduler node 16a, and/or a wireless connection with another scheduler node, such as scheduler node 16b. The radio interface may be formed as or may include, for example, one or more RF transmitters, one or more RF receivers, and/or one or more RF transceivers.

In the embodiment shown, the hardware 60 of the scheduler node 16a further includes processing circuitry 64. The processing circuitry 64 may include a processor 66 and a memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). In some embodiments, the memory 68 may include a buffer in which demodulated data (e.g., received via an UL receiver which may be implemented, for example, in communication interface 62) may be stored, for retrieval and decoding later according to the techniques disclosed herein, such as, for example, the techniques described as being performed by the storage determination unit 36.

Thus, the scheduler node 16a further has software 70 stored internally in, for example, memory 68 or stored externally in external memory. The memory 68 may include external memory (e.g., database, storage array, network storage device, etc.) accessible by the processing circuitry 64 via e.g., an external connection. The software 70 may be executable by the processing circuitry 64. The processing circuitry 64 may be configured to control any of the methods and/or processes described herein and/or to cause such methods, and/or processes to be performed, e.g., by scheduler node 16a. Processor 66 corresponds to one or more processors 66 for performing scheduler node 16a functions described herein. The memory 68 is configured to store data (e.g., data received via a physical UL channel), programmatic software code and/or other information described herein. In some embodiments, the software 70 may include instructions that, when executed by the processor 66 and/or processing circuitry 64, causes the processor 66 and/or processing circuitry 64 to perform the processes described herein with respect to scheduler node 16a. For example, processing circuitry 64 of the scheduler node 16a may include pre-data transfer unit 32 configured to receive data for the WD 22, the data to be scheduled for transmission to the WD 22 in the second cell 18b. The pre-data transfer unit 32 is configured to transfer the data to the second scheduler node 16b for scheduling transmission of the data in the second cell 18b. The pre-data transfer unit 32 is configured to, as a result of the transfer of the data, receive a scheduling decision from the second scheduler node 16b, the received scheduling decision scheduling the transmission of at least a portion of the data to the WD 22 in at least one physical downlink channel in the second cell 18b.

In some embodiments, the processing circuitry 64 is further configured to receive the scheduling decision by being configured to receive the scheduling decision after the transfer of the data to the second scheduler node 16b. In some embodiments, the processing circuitry 64 is further configured to receive the scheduling decision by being configured to receive the scheduling decision as a result of the transfer of the data to the second scheduler node 16b. In some embodiments, the at least one downlink channel is configured according to the scheduling decision of the second scheduler node 16b. In some embodiments, the at least one physical downlink channel is a physical downlink shared channel, PDSCH. In some embodiments, the scheduling decision includes scheduling information for the at least one downlink channel in the second cell 18b, the scheduling information including downlink control information, DCI. In some embodiments, the first scheduler node 16a is configured to communicate with the second scheduler node 16b via a backhaul link 24 for independent scheduling of the WD 22 in carrier aggregation mode with coordinated uplink control information, UCI. In some embodiments, the processing circuitry 64 is further configured to transfer the data by being configured to transfer the data from the first scheduler node 16a to the second scheduler node 16b via a backhaul link 24. In some embodiments, the processing circuitry 64 is further configured to transfer the data by being configured to transfer the data from the first scheduler node 16a to the second scheduler node 16b via an X2 interface. In some embodiments, the second cell is an external cell, Escell, relative to the first cell. In some embodiments, the processing circuitry 64 is further configured to, receive uplink control information, UCI, on orthogonal UCI resources, the orthogonal UCI resources comprising a first set of UCI resources for the first cell 18a and a second set of UCI resources for the second cell 18b, the first set of UCI resources not overlapping the second set of UCI resources. In some embodiments, each set of UCI resources is a set of non-overlapping subframes. In some embodiments, the first scheduler node 16a and the second scheduler node 16b are Medium Access Control, MAC, schedulers.

The processing circuitry 64 may also include storage determination unit 36 configured to receive data via a physical uplink channel, the physical uplink channel including uplink control information, UCI. The processing circuitry 64 is configured to determine whether the UCI is triggered by a second scheduler node, the second scheduler node 16b configured to perform scheduling for the WD 22 in a second cell 18b. The processing circuitry 64 is configured to, in response to determining that the UCI is triggered by the second scheduler node 16b, demodulate and store the received data in a buffer. The processing circuitry 64 is configured to, in response to receiving an indication of a number of bits in the UCI from the second scheduler node 16b, retrieve the data from the buffer and decode the data using the indication.

In some embodiments, the physical uplink channel is one of a physical uplink shared channel, PUSCH, and a physical uplink control channel, PUCCH. In some embodiments, the UCI is triggered by the second scheduler node 16b based on the second scheduler node 16b scheduling downlink transmissions in the second cell 18b, the downlink transmissions triggering hybrid-automatic repeat request, HARQ, feedback in the UCI. In some embodiments, the second cell 18b is different from the first cell 18a. In some embodiments, the processing circuitry 64 is further configured to decode the UCI using the indication and transmit the UCI to the second scheduler node 16b. In some embodiments, the processing circuitry 64 is further configured to receive the indication of the number of bits in the UCI in a message from the second scheduler node 16b.

The communication system 10 further includes the scheduler node 16b already referred to. The scheduler node 16b may have hardware 80 that may include a communication interface 82. The communication interface 82 may be configured for setting up and maintaining a wired or wireless connection with an interface of a different communication device of the communication system 10, such as scheduler node 16a, over e.g., a backhaul link 24. The communication interface 82 may be configured to include a radio interface for setting up and maintaining at least a wireless connection with a WD 22 located in a cell 18 served by the scheduler node 16b, and/or a wireless connection with another scheduler node, such as scheduler node 16a. The radio interface may be formed as or may include, for example, one or more RF transmitters, one or more RF receivers, and/or one or more RF transceivers.

In the embodiment shown, the hardware 80 of the scheduler node 16b further includes processing circuitry 84. The processing circuitry 84 may include a processor 86 and a memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) the memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the scheduler node 16b further has software 90 stored internally in, for example, memory 88 or stored externally in external memory. The memory 88 may include in external memory (e.g., database, storage array, network storage device, etc.) accessible by the processing circuitry 84 via e.g., an external connection. The software 90 may be executable by the processing circuitry 84. The processing circuitry 84 may be configured to control any of the methods and/or processes described herein and/or to cause such methods, and/or processes to be performed, e.g., by scheduler node 16b. Processor 86 corresponds to one or more processors 86 for performing scheduler node 16b functions described herein. The memory 88 is configured to store data (e.g., data received for the WD 22 from scheduler node 16a), programmatic software code and/or other information described herein. In some embodiments, the software 90 may include instructions that, when executed by the processor 86 and/or processing circuitry 84, causes the processor 86 and/or processing circuitry 84 to perform the processes described herein with respect to scheduler node 16b. For example, processing circuitry 84 of the scheduler node 16b may include scheduling determination unit 34 configured to receive data for the WD 22 from the first scheduler node 16a, the data to be scheduled for transmission to the WD 22 in the second cell 18b. The processing circuitry 84 is configured to, as a result of receiving the data, determine a scheduling decision, the scheduling decision scheduling the transmission of at least a portion of the data to the WD 22 in at least one physical downlink channel in the second cell 18b. The processing circuitry 84 is configured to transmit the scheduling decision to the first scheduler node 16a.

In some embodiments, the processing circuitry 84 is further configured to transmit the at least the portion of the data to the WD 22 in the at least one physical downlink channel in the second cell 18b. In some embodiments, the processing circuitry 84 is further configured to determine the scheduling decision by being configured to determine the scheduling decision after the data is received from the first scheduler node 16a. In some embodiments, the processing circuitry 84 is further configured to determine the scheduling decision by being configured to determine the scheduling decision in response to receiving the data from the first scheduler node 16a. In some embodiments, the processing circuitry 84 is further configured to configure the at least one downlink channel according to the scheduling decision of the second scheduler node 16b. In some embodiments, the at least one physical downlink channel is a physical downlink shared channel, PDSCH. In some embodiments, the scheduling decision includes scheduling information for the at least one downlink channel in the second cell 18b, the scheduling information including downlink control information, DCI. In some embodiments, the second scheduler node 16b is configured to communicate with the first scheduler node 16a via a backhaul link 24 for independent scheduling of the WD 22 in carrier aggregation mode with coordinated uplink control information, UCI. In some embodiments, the processing circuitry 84 is further configured to receive the data by being configured to receive the data from the first scheduler node 16a via a backhaul link 24. In some embodiments, the processing circuitry 84 is further configured to receive the data by being configured to receive the data from the first scheduler node 16a via an X2 interface. In some embodiments, the second cell 18b is an external cell, Escell, relative to the first cell 18a. In some embodiments, the processing circuitry 84 is further configured to receive uplink control information, UCI, on orthogonal UCI resources, the orthogonal UCI resources comprising a first set of UCI resources for the first cell 18a and a second set of UCI resources for the second cell 18b, the first set of UCI resources not overlapping the second set of UCI resources. In some embodiments, each set of UCI resources is a set of non-overlapping subframes. In some embodiments, the first scheduler node 16a and the second scheduler node 16b are Medium Access Control, MAC, schedulers.

It is noted that, although different reference numbers are used to describe certain components of scheduler nodes 16a and 16b, it is understood that scheduler nodes 16a and 16b can contain some or all of the same types of components. Similarly, a scheduler node 16a can include the components and functionality of a scheduler node 16b and vice versa. In other words, the structural and functional distinctions between scheduler node 16a and scheduler node 16b shown and described herein are purely to aid explanation and understanding. Thus, scheduler node 16a and scheduler node 16b are both the more general scheduler node 16.

Figure 2:
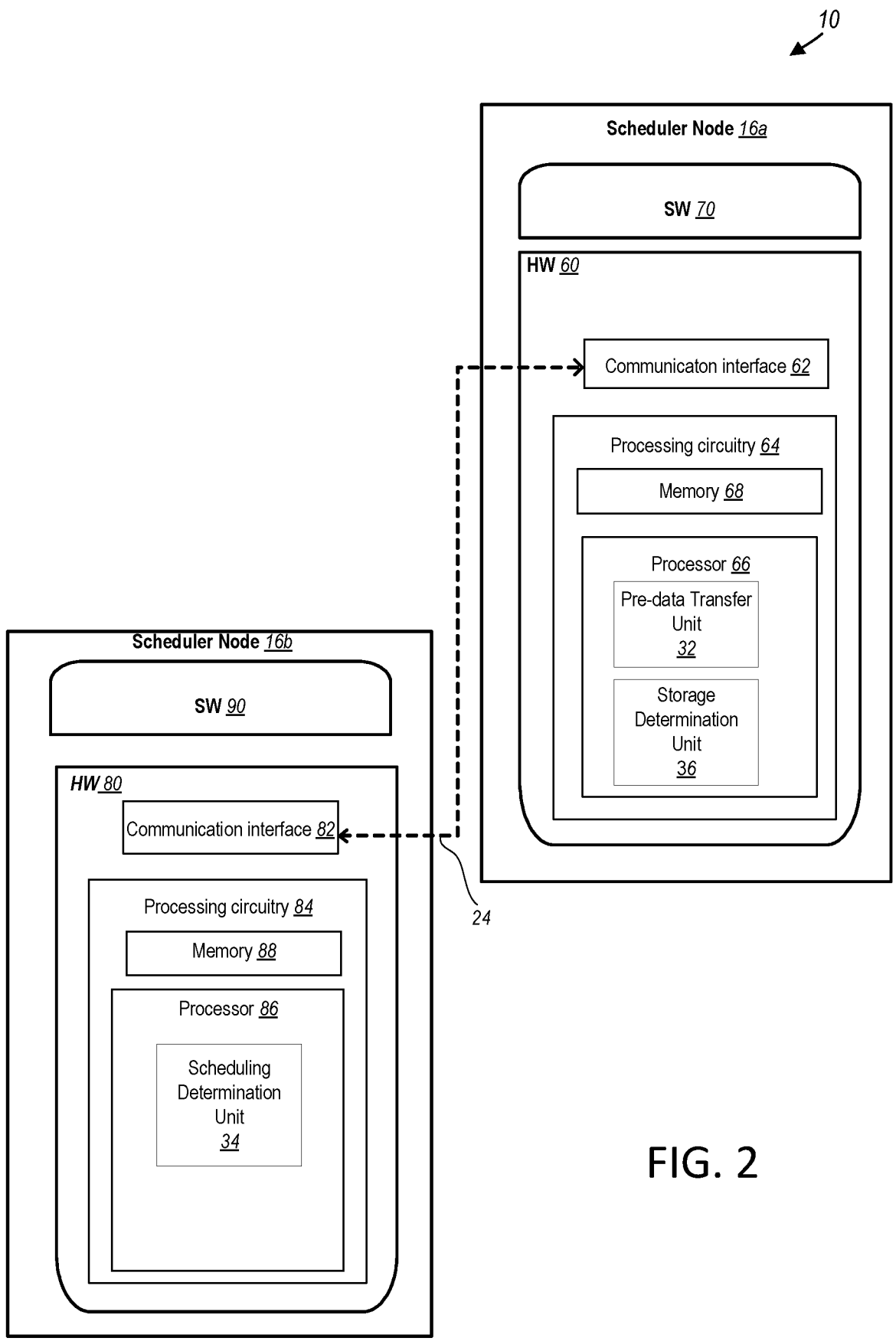
FIG. 2 is a block diagram of a first scheduler node in communication with a second scheduler node over at least part of a backhaul link according to some embodiments of the present disclosure.

In FIG. 2, the connection between the first scheduler node 16a and the second scheduler node 16b is shown without explicit reference to any intermediary devices and the precise routing of messages via these devices. Network infrastructure may determine the routing, which it may be configured to hide from the WD 22 or from a service provider, or both. The network infrastructure may further take decisions by which it dynamically changes the routing (e.g., on the basis of load balancing consideration or reconfiguration of the network). The connection may include a backhaul link 24.

Although FIGS. 1 and 2 show various "units" such as pre-data transfer unit 32, scheduling determination unit 34 and storage determination unit 36 as being within a respective processor, it is contemplated that these units may be implemented such that a portion of the unit is stored in a corresponding memory within the processing circuitry. In other words, the units may be implemented in hardware or in a combination of hardware and software within the processing circuitry.

The communication system 10 may further includes the WD 22 already referred to and depicted in FIG. 1. The WD 22 may have hardware that may include a radio interface configured to set up and maintain a wireless connection with a scheduler node 16 serving a cell 18 in which the WD 22 is currently located. The radio interface may be formed as or may include, for example, one or more RF transmitters, one or more RF receivers, and/or one or more RF transceivers. The hardware of the WD 22 further includes processing circuitry. The processing circuitry may include a processor and memory. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor may be configured to access (e.g., write to and/or read from) memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software, which is stored in, for example, memory at the WD 22. The software may be executable by the processing circuitry. The software may include a client application. The client application may be operable to provide a service to a human or non-human user via the WD 22. In providing the service to the user, the client application may receive request data and provide user data in response to the request data. The client application may interact with the user to generate the user data that it provides.

The processing circuitry may be configured to control any of the methods and/or processes described herein and/or to cause such methods, and/or processes to be performed, e.g., by WD 22. The processor corresponds to one or more processors for performing any WD 22 functions described herein. The WD 22 includes memory that is configured to store data, programmatic software code and/or other information described herein. In some embodiments, the software and/or the client application may include instructions that, when executed by the processor and/or processing circuitry, causes the processor and/or processing circuitry to perform the processes described herein with respect to WD 22. For example, the processing circuitry and/or radio interface of the wireless device 22 may be configured to cause the WD 22 to receive, demodulate and/or decode the physical downlink channel in a cell (e.g., Escell 18b) and/or transmit an uplink channel (e.g., UCI, ACK/NACK) in a cell (e.g., Pcell 18a).

Figure 3:
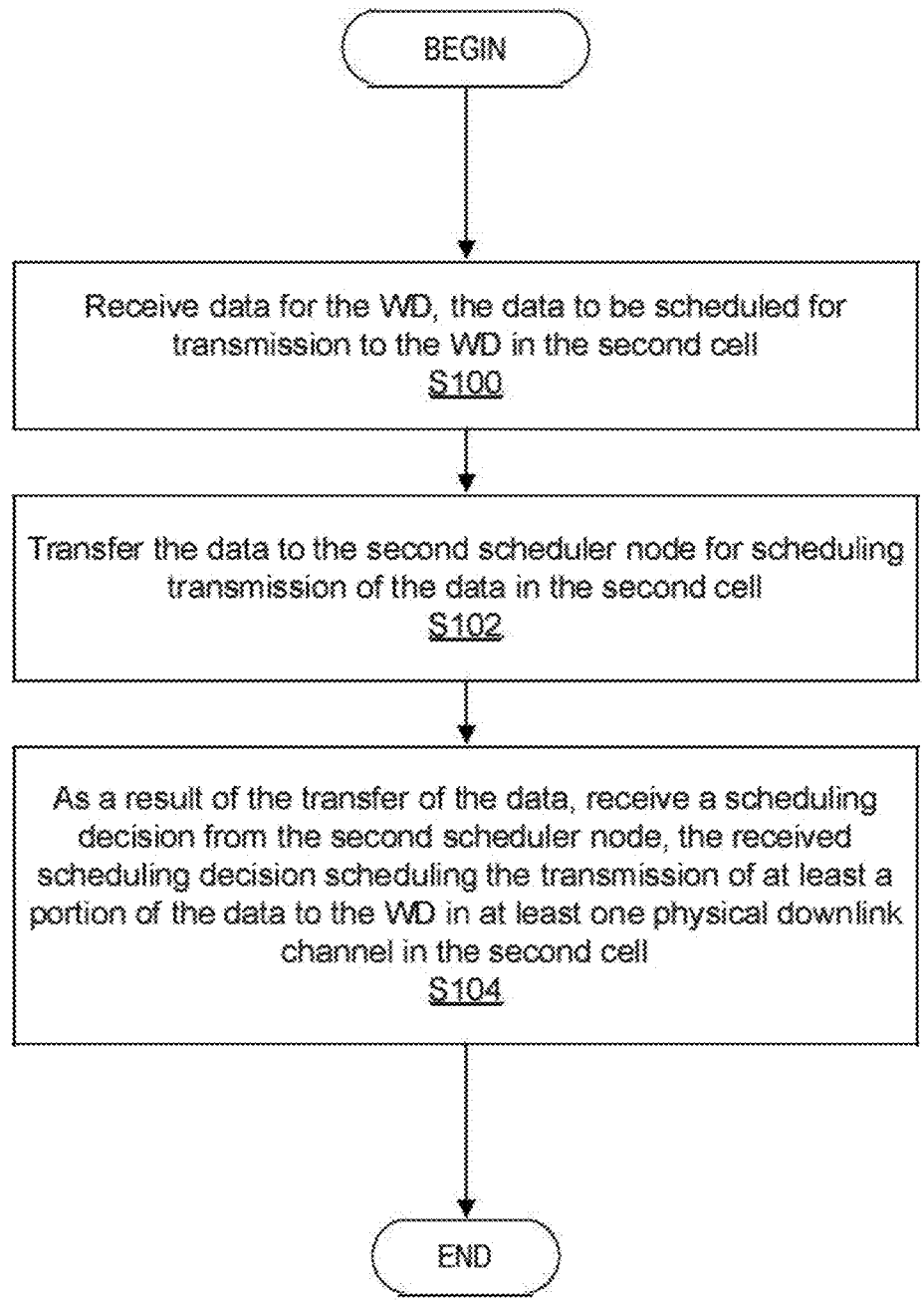
FIG. 3 is a flowchart of an exemplary process in a first scheduler node for pre-data transfer unit according to some embodiments of the present disclosure.

FIG. 3 is a flowchart of an exemplary process in a scheduler node 16 (e.g., first scheduler node 16a) for pre-data transfer according to some embodiments of the present disclosure. One or more Blocks and/or functions and/or methods performed by the scheduler node (e.g., scheduler node 16a) may be performed by one or more elements of scheduler node 16 such as by pre-data transfer unit 32 in processing circuitry 64, processor 66, communication interface 62, etc. according to the example method. The example method includes receiving (Block S100), such as via processing circuitry 64 and/or communication interface 62, data for the WD 22, the data to be scheduled for transmission to the WD 22 in the second cell 18b. The method includes transferring (Block S102), such as via processing circuitry 64 and/or communication interface 62, the data to the second scheduler node 16b for scheduling transmission of the data in the second cell 18b. The method includes, as a result of the transfer of the data, receiving (Block S104), such as via processing circuitry 64 and/or communication interface 62, a scheduling decision from the second scheduler node 16b, the received scheduling decision scheduling the transmission of at least a portion of the data to the WD 22 in at least one physical downlink channel in the second cell 18b.

In some embodiments, the receiving the scheduling decision further comprises receiving the scheduling decision after the transfer of the data to the second scheduler node 16b. In some embodiments, wherein the receiving the scheduling decision further comprises receiving the scheduling decision as a result of the transfer of the data to the second scheduler node 16b. In some embodiments, the method further comprises configuring, such as via processing circuitry 64, the at least one downlink channel according to the scheduling decision of the second scheduler node 16b. In some embodiments, the at least one physical downlink channel is a physical downlink shared channel, PDSCH. In some embodiments, the scheduling decision includes scheduling information for the at least one downlink channel in the second cell 18b, the scheduling information including downlink control information, DCI. In some embodiments, the second scheduler node 16b is configured to communicate with the first scheduler node 16a via a backhaul link 24 for independent scheduling of the WD 22 in carrier aggregation mode with coordinated uplink control information, UCI. In some embodiments, the transferring the data to the second scheduler node 16b is via a backhaul link 24. In some embodiments, the transferring the data to the second scheduler node 16b is via an X2 interface. In some embodiments, the second cell 18b is an external cell, Escell, relative to the first cell 18a. In some embodiments, the method further comprises receiving, such as via processing circuitry 64 and/or communication interface 62, uplink control information, UCI, on orthogonal UCI resources, the orthogonal UCI resources comprising a first set of UCI resources for the first cell 18a and a second set of UCI resources for the second cell 18b, the first set of UCI resources not overlapping the second set of UCI resources. In some embodiments, each set of UCI resources is a set of non-overlapping subframes. In some embodiments, the first scheduler node 16a and the second scheduler node 16b are MAC schedulers.

Figure 4:
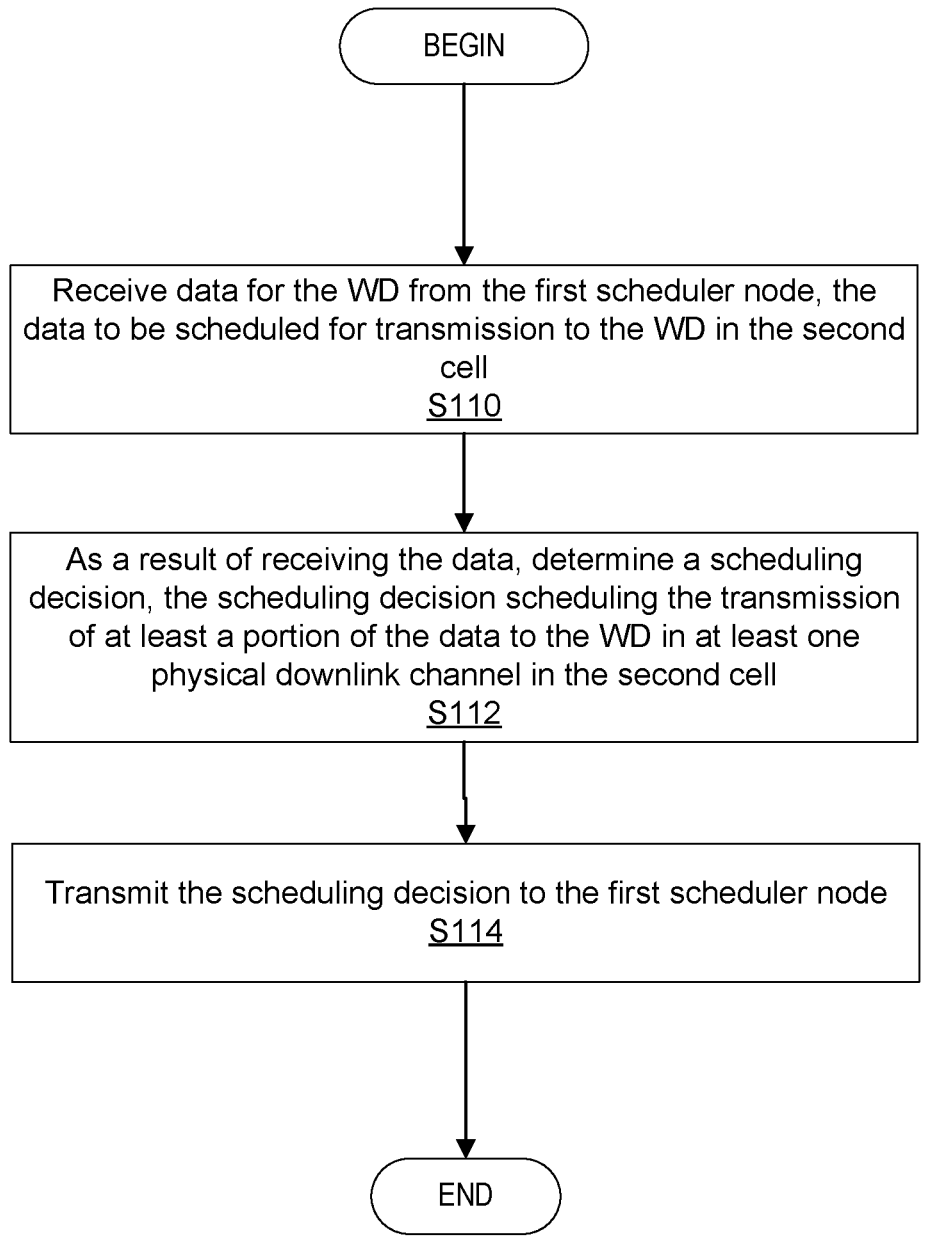
FIG. 4 is a flowchart of an exemplary process in a second scheduler node for scheduling determination unit according to some embodiments of the present disclosure.

FIG. 4 is a flowchart of an exemplary process in a scheduler node (e.g., second scheduler node 16b) for scheduling according to some embodiments of the present disclosure. One or more Blocks and/or functions and/or methods performed by WD 22 may be performed by one or more elements of WD 22 such as by scheduling determination unit 34 in processing circuitry 84, processor 86, communication interface 82, etc. The example method includes receiving (Block S110), such as via processing circuitry 84 and/or communication interface 82, data for the WD 22 from the first scheduler node 16a, the data to be scheduled for transmission to the WD 22 in the second cell 18b. The method includes, as a result of receiving the data, determining (Block S112), such as via processing circuitry 84 and/or communication interface 82, a scheduling decision, the scheduling decision scheduling the transmission of at least a portion of the data to the WD 22 in at least one physical downlink channel in the second cell 18b. The method includes transmitting (Block S114), such as via processing circuitry 84 and/or communication interface 82, the scheduling decision to the first scheduler node 16a.

In some embodiments, the method further comprises transmitting, such as via processing circuitry 84 and/or communication interface 82, the at least the portion of the data to the WD 22 in the at least one physical downlink channel in the second cell 18b. In some embodiments, the determining the scheduling decision further comprises determining the scheduling decision after the data is received from the first scheduler node 16a. In some embodiments, the determining, such as via processing circuitry 84, the scheduling decision further comprises determining the scheduling decision in response to receiving the data from the first scheduler node 16a. In some embodiments, the method further comprises configuring, such as via processing circuitry 84, the at least one downlink channel according to the scheduling decision of the second scheduler node 16b. In some embodiments, the at least one physical downlink channel is a physical downlink shared channel, PDSCH. In some embodiments, the scheduling decision includes scheduling information, such as via processing circuitry 84, for the at least one downlink channel in the second cell 18b, the scheduling information including downlink control information, DCI. In some embodiments, the first scheduler node 16a is configured to communicate with the second scheduler node 16b via a backhaul link 24 for independent scheduling of the WD 22 in carrier aggregation mode with coordinated uplink control information, UCI. In some embodiments, the receiving the data further comprises receiving, such as via processing circuitry 84 and/or communication interface 82, the data from the first scheduler node 16a via a backhaul link 24. In some embodiments, the receiving the data further comprises receiving, such as via processing circuitry 84 and/or communication interface 82, the data from the first scheduler node 16a via an X2 interface. In some embodiments, the second cell 18b is an external cell, Escell, relative to the first cell 18a. In some embodiments, the method comprises receiving, such as via processing circuitry 84 and/or communication interface 82, uplink control information, UCI, on orthogonal UCI resources, the orthogonal UCI resources comprising a first set of UCI resources for the first cell 18a and a second set of UCI resources for the second cell 18b, the first set of UCI resources not overlapping the second set of UCI resources. In some embodiments, each set of UCI resources is a set of non-overlapping subframes. In some embodiments, the first scheduler node 16a and the second scheduler node 16b are MAC schedulers.

Figure 5:
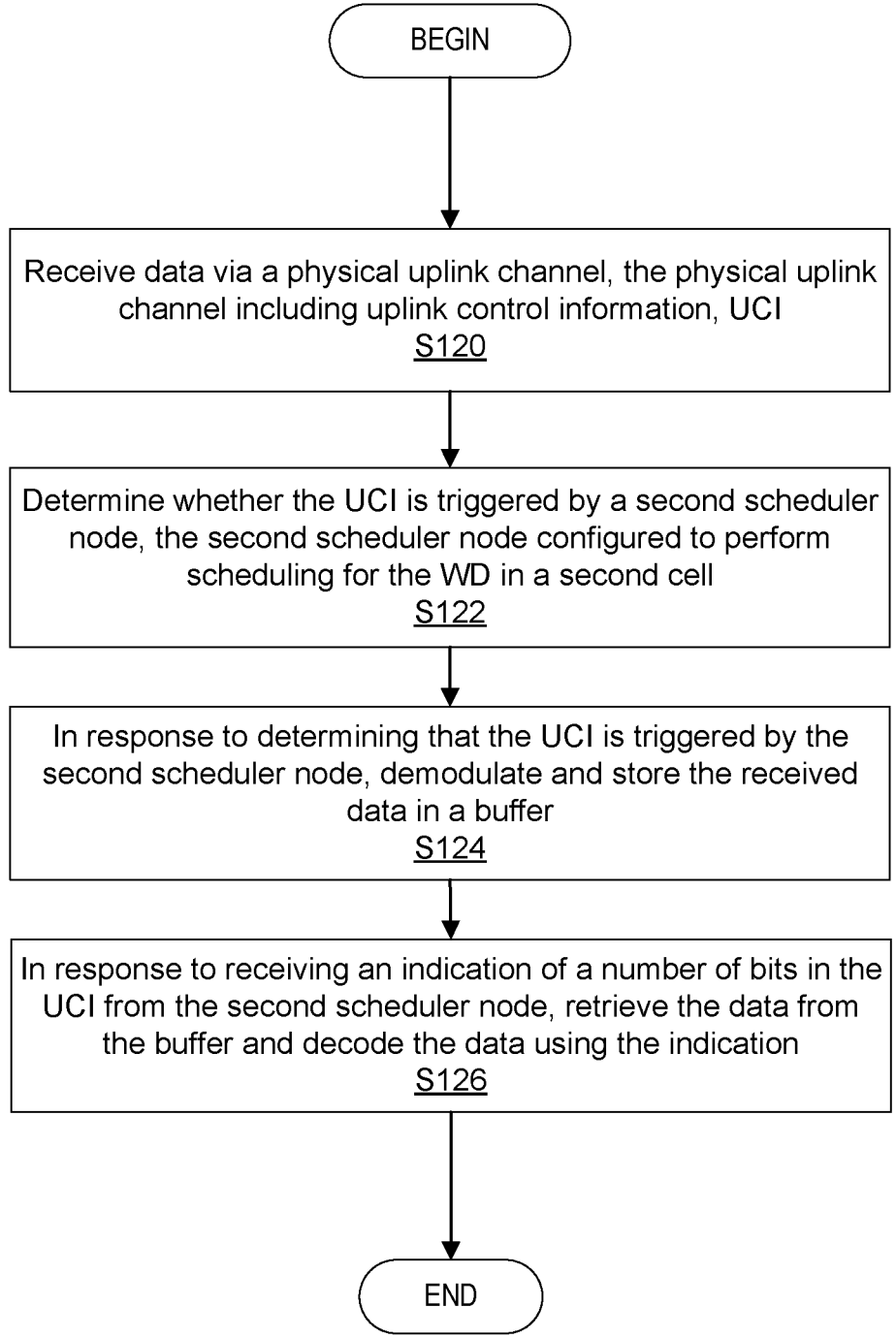
FIG. 5 is a flowchart of yet another exemplary process in the first scheduler node for storage determination unit according to some embodiments of the present disclosure.

FIG. 5 is a flowchart of an exemplary process in a scheduler node (e.g., first scheduler node 16a) according to some embodiments of the present disclosure. One or more Blocks and/or functions and/or methods performed by the scheduler node (e.g., scheduler node 16a) may be performed by one or more elements of scheduler node 16 such as by storage determination unit 36 in processing circuitry 64, processor 66, communication interface 62, etc. according to the example method. The example method includes receiving (Block S120), such as via processing circuitry 64 and/or communication interface 62, data via a physical uplink channel, the physical uplink channel including uplink control information, UCI. The method includes determining (Block S122), such as via processing circuitry 64 and/or communication interface 62, whether the UCI is triggered by a second scheduler node 16b, the second scheduler node 16b configured to perform scheduling for the WD 22 in a second cell 18b. The method includes, in response to determining that the UCI is triggered by the second scheduler node 16b, demodulating and storing (Block S124), such as via processing circuitry 64 and/or communication interface 62 and/or memory 68, the received data in a buffer. The method includes, in response to receiving an indication of a number of bits in the UCI from the second scheduler node 16b, retrieving (Block S124), such as via processing circuitry 64 and/or communication interface 62 and/or memory 68, the data from the buffer and decoding the data using the indication.

In some embodiments, the physical uplink channel is one of a physical uplink shared channel, PUSCH, and a physical uplink control channel, PUCCH. In some embodiments, the UCI is triggered by the second scheduler node 16b based on the second scheduler node 16b scheduling downlink transmissions in the second cell 18b, the downlink transmissions triggering hybrid-automatic repeat request, HARQ, feedback in the UCI. In some embodiments, the second cell 18b is different from the first cell 18a. In some embodiments, the method further comprises decoding, such as via processing circuitry 64, the UCI using the indication and transmitting the UCI to the second scheduler node 16b. In some embodiments, the receiving the indication of the number of bits in the UCI further comprises receiving, such as via processing circuitry 64 and/or communication interface 62, the indication in a message from the second scheduler node 16b.

Having described some embodiments for coordinating UCI between remote scheduler nodes for CA, a more detailed description of some of the embodiments of the present disclosure is described below.

Some solutions for handling UCI coordination for distributed CA scheduling can be broadly classified into combinations of at least three main concepts, which include the following:
  Central or distributed scheduling (e.g., Is a single node responsible for all scheduling decisions for a WD?)
  Single or multiple buffers (e.g., Is all data stored in a single 'logical' location?)
  Single or duplicated packets (e.g., Is any data located at more than one point?) While this provides up to eight possible combinations, some embodiments of the present disclosure may focus on a subset of these combinations. FIG. 6 illustrates some of the combinations by comparing two types of known CA scheduling solutions, namely, Xn-based CA and Elastic Radio Access Network (ERAN)-based CA, which are discussed in more detail below.

ERAN-Based NR Solution

Initially, there are differences between LTE and NR that may be relevant to implementation of CA with remote scheduler nodes 16. For example, in LTE, an external secondary cell (Escell) (e.g., cell 18b) has the same slot duration as the Pcell (e.g., cell 18a). On the hand, in NR, an Escell (e.g., cell 18b) in high band has a much shorter slot duration. For ERAN-based solution, the scheduler node 16b for the Escell performs the scheduling for Escell and the scheduler node 16a for Pcell performs the scheduling for Pcell (e.g., CA with distributed scheduling). Although Pcell (e.g., cell 18a) and Escell (e.g., cell 18b) have different schedulers (e.g., scheduler node 16a and scheduler node 16b, respectively) it may not be an issue if, for example, physical downlink shared channel (PDSCH) transmissions on the Escell (e.g., cell 18b) are scheduled by itself, i.e., scheduler node 16b for the Escell (as opposed to the Escell being scheduled by a scheduler node of another cell, such as the scheduler node 16a for the Pcell).

Figure 7:
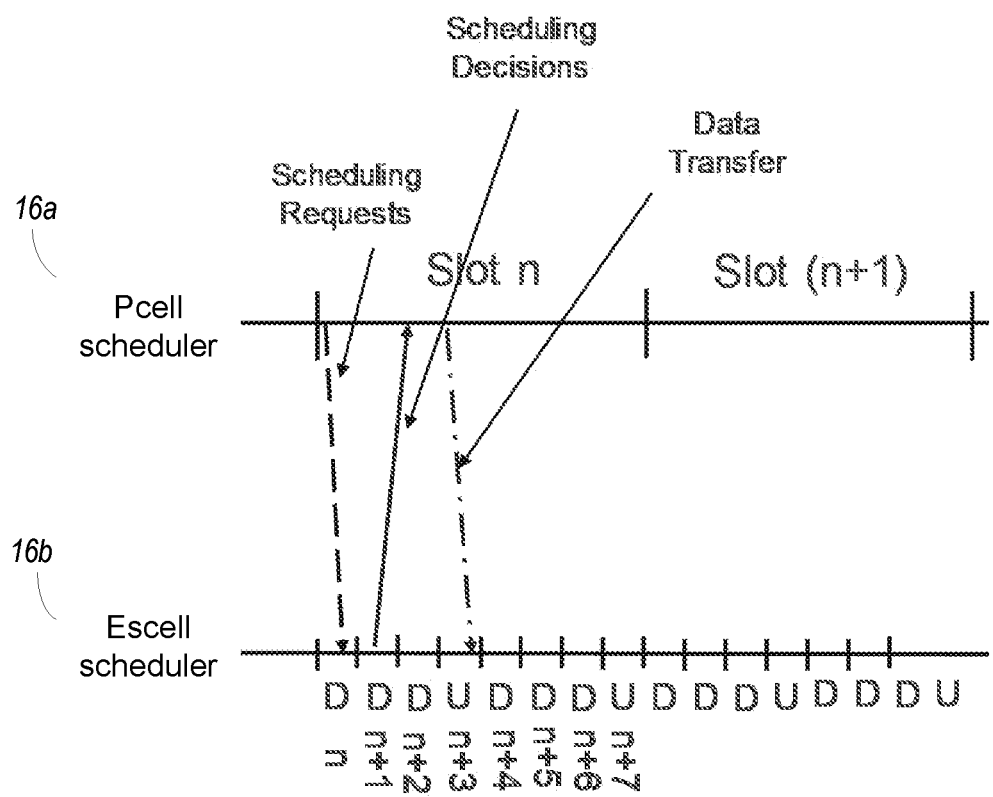
FIG. 7 is a schematic diagram illustrating an example of CA scheduling coordination between a Pcell and an Escell.

The following changes may be implemented to support ERAN-based inter-site (e.g., two or more different schedulers or base stations serving two or more different respective cells for CA) for NR, as shown, for example, in FIG. 7. FIG. 7 illustrates an example of CA scheduling coordination between a scheduler node 16a of Pcell (e.g., cell 18a) and a scheduler node 16b of Escell (e.g., cell 18b) that runs over more Escell slots than Pcell slots. Escell 18b has a slot duration of 125 us (subcarrier spacing (SCS)=120 kHz), compared to the Pcell slot of 1000 us (round trip time (RTT) requirements may be 45 us or shorter). When scheduler node 16a for Pcell 18a requests that scheduler node 16b for Escell 18b schedule a WD 22 in an Escell slot n, the actual transmission on the Escell 18b will be in slot n+k, where k>2. For LTE, the actual transmission would be on TTI n+2. Given there are multiple DL Escell slots within/overlapping a Pcell slot (as shown in FIG. 7), the Escell 18b can have multiple DL transmissions for one scheduling request from scheduler node 16a for Pcell 18a.

Figure 8:
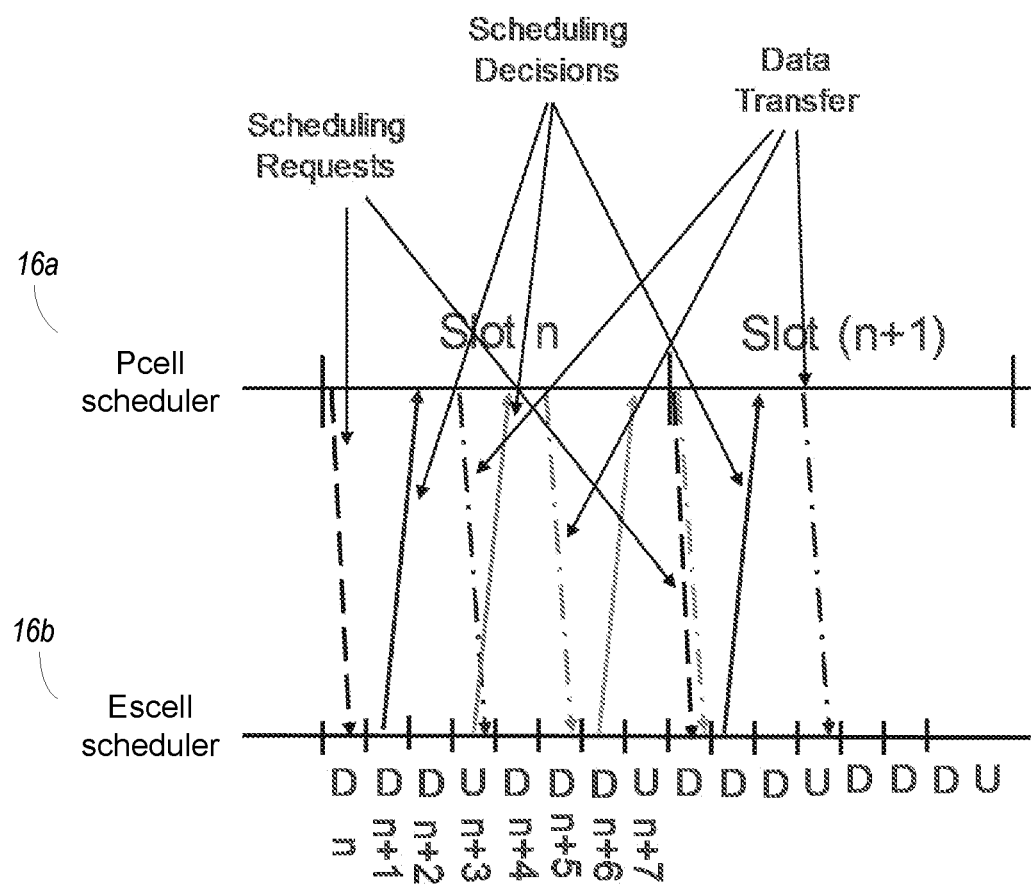
FIG. 8 is a schematic diagram illustrating an example of message exchanges between scheduler nodes for Pcell and Escell.

FIG. 8 illustrates an example of the message exchange between scheduler node 16a for Pcell 18a and remote scheduler node 16b for Escell 18b for scheduling downlink transmissions in the secondary cell (e.g., Escell) using some existing techniques. The message exchanges between remote scheduler nodes 16a and 16b may be via a backhaul link 24. As shown in FIG. 8, scheduler node 16a for Pcell 18a sends one scheduling request to scheduler node 16b for Escell 18b every Pcell slot (e.g., slot n and slot n+1). Scheduler node 16b for Escell 18b processes the request in the next scheduling phase, and allocates the appropriate downlink resources in Escell 18b (e.g., PDSCH and/or PDCCH resources) to satisfy the request. Scheduler node 16b for Escell 18b informs scheduler node 16a for Pcell 18a about the scheduling decision via a scheduling decision message. Scheduler node 16a for Pcell 18b builds transport blocks and/or transport block sizes (TBSs) according to the scheduling decision, and forwards the TBSs to remote scheduler node 16b for Escell 18b e.g., via a data transfer message. Scheduler node 16b for Escell 18b then transmits the TBSs received from scheduler node 16a for Pcell 18a to e.g., the WD 22 in a downlink communication via carrier for Escell 18b. If scheduler node 16b for Escell 18b is unable to transmit all data in the TBSs in one slot, scheduler node 16b can continue to schedule the remaining data in the following DL slots in Escell 18b.

However, such ERAN-based solution may have several problems such as:
  1) such scheduling coordination between the remote scheduler nodes 16a and 16b requires a 2*backhaul (BH) delay worth of prescheduling; and
  2) data is transferred at a high priority.

On the other hand, such ERAN-based solution may require very little change to existing devices to work, and because the scheduler node 16a for Pcell 18a knows the scheduling decisions of the scheduler node 16b for Escell 18b before scheduling, UCI coordination can occur automatically.

Some embodiments of the present disclosure consider some enhancements to solve the problems with existing solutions.

Pre-data Transfer According to one embodiment of the present invention, data is transferred to the remote scheduler node 16b before scheduling decisions are made. Non-limiting examples of such scheduling decisions include counter downlink assignment index (cDAI), total downlink assignment index (TDAI), resources used, precoder selected, power level sent, Transport block size, time to send the PDCCH, time to send the PDSCH and k0, k1, k2 values (offsets between PDCCH and PDSCH, and PUSCH, and PUCCH, respectively).

Figure 9:
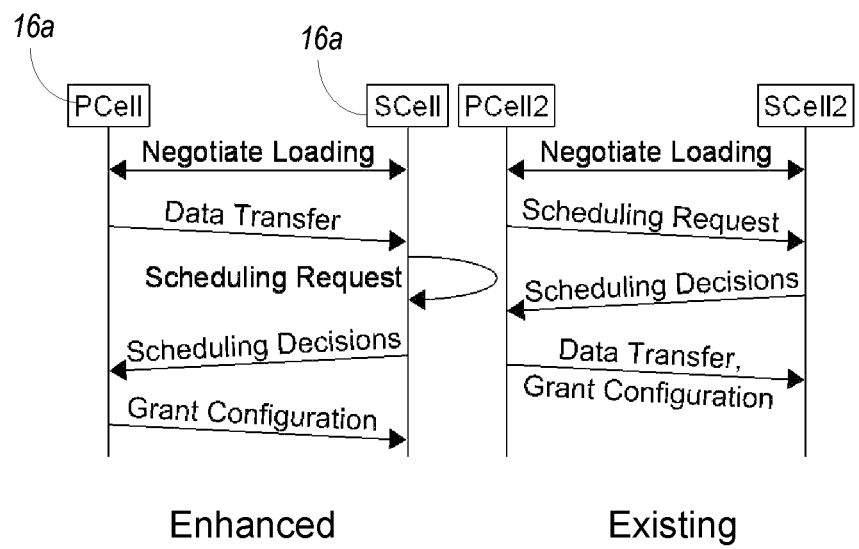
FIG. 9 is a schematic diagram comparing an existing technique for CA coordination between remote scheduler nodes and the enhanced solution according to one embodiment of the present disclosure.

FIG. 9 shows a comparison between an existing technique for CA coordination between remote scheduler nodes and an enhanced solution according to the present disclosure. In order to reduce the latency that may be introduced when transferring the data after the scheduling decision (as with existing techniques), some embodiments of the present disclosure propose to instead transfer the data ahead of time before the scheduling decisions for the data are even made. In addition, by transferring the data ahead of time the scheduler node 16b for Escell 18b can then generate the correct RLC headers for such pre-transferred data and transmit the data accordingly. Because the data transfer may no longer be sent with high delay requirements, less resources are consumed even if the resources are sometimes not used. The scheduler node 16a for Pcell 18a may retain a copy of this data, or if the scheduler node 16b for Escell 18b cannot transfer the data in a required time scheduler node 16b may transfer the data back to scheduler node 16a. Note that the while signals/messages are shown in FIG. 9, only the final one is within the scheduling loop and impacts Hybrid Automatic Repeat request (HARQ) RTT. In some embodiments, the 'Grant Configuration' message may not be required.

Xn-Based NR Solution

Figure 10:
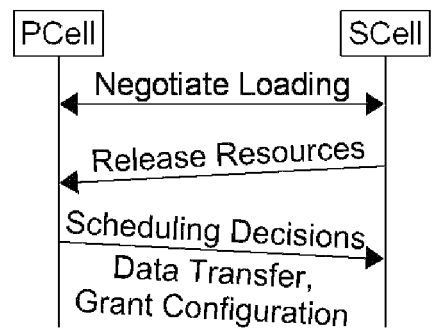
FIG. 10 is a schematic diagram illustrating an example of Xn-based CA scheduling between remote scheduler nodes.

The existing Xn-based NR solution can essentially be described as having the scheduler node for the Pcell perform all the scheduling for the secondary cell (Scell), as illustrated, for example, in FIG. 10 (e.g., CA with centralized scheduling). The Scell uses heuristics and measurements to negotiate loading and releases resources to the Pcell, which the PCell then schedules over. To deal with BH delay, the scheduling is performed several TTIs in advance.

Some embodiments of the present disclosure propose implementing a pre-data transfer, as discussed above with ERAN, for Xn-based scheduling, as well. For example, as discussed above with ERAN, in order to reduce the data transfer latency requirements the scheduler node 16a for Pcell 18a can transfer the data to Scell before the scheduling decision is made. This can reduce the signaling requirements to very small control messages.

Accordingly, pre-data transfer according to the techniques in the present disclosure can be implemented in ERAN and/or Xn-based CA solutions, as well as, other types of coordinated scheduling schemes for CA.

FIG. 11 shows an example comparison chart of features between existing ERAN, existing Xn and ERAN with pre-data transfer according to some embodiments of the present disclosure. As shown in FIG. 11, ERAN with pre-data transfer reduces the delay as compared with existing ERAN by at least half and may, in some implementations, reduce the delay even as compared with Xn.

High Layer RLC Split

Figure 12:
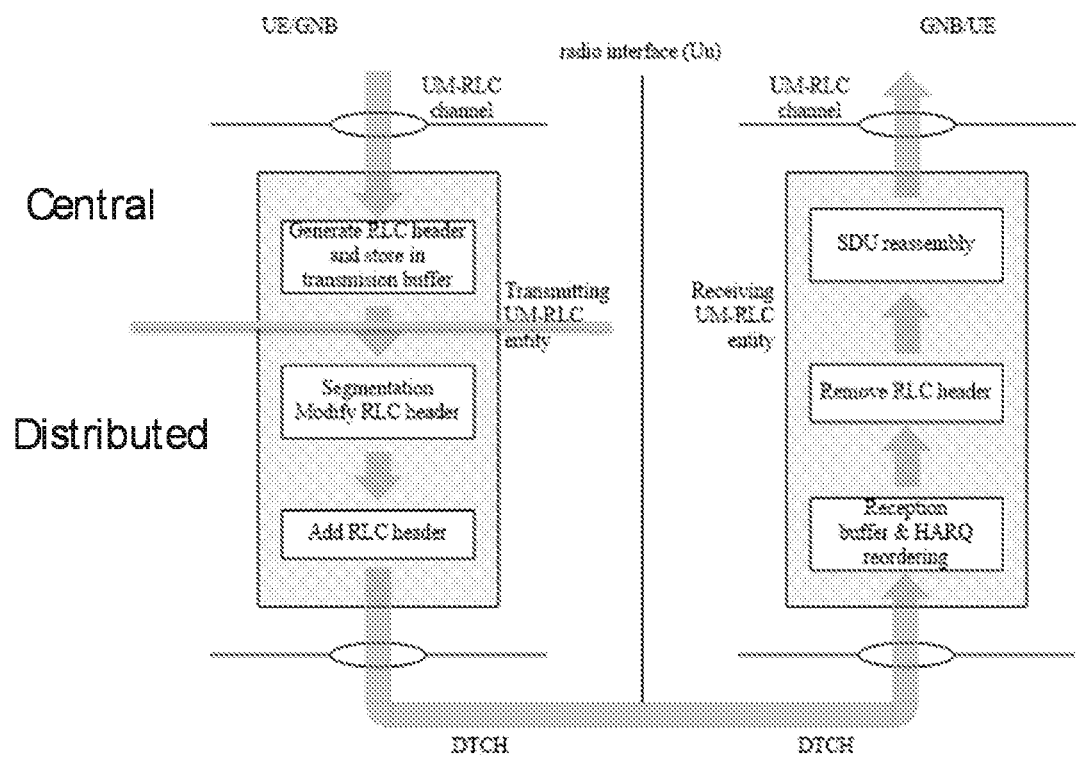
FIG. 12 is a schematic diagram illustrating RLC split according to some embodiments of the present disclosure.

Some embodiments of the present disclosure further propose providing for a higher layer RLC split for CA with distributed scheduling. In order to perform distributed scheduling with CA, a 'low RLC layer split' in which the MAC headers are attached at a central node, while real time processing (e.g., segmentation) is performed locally, as shown, for example, in FIG. 12.

Figure 13:
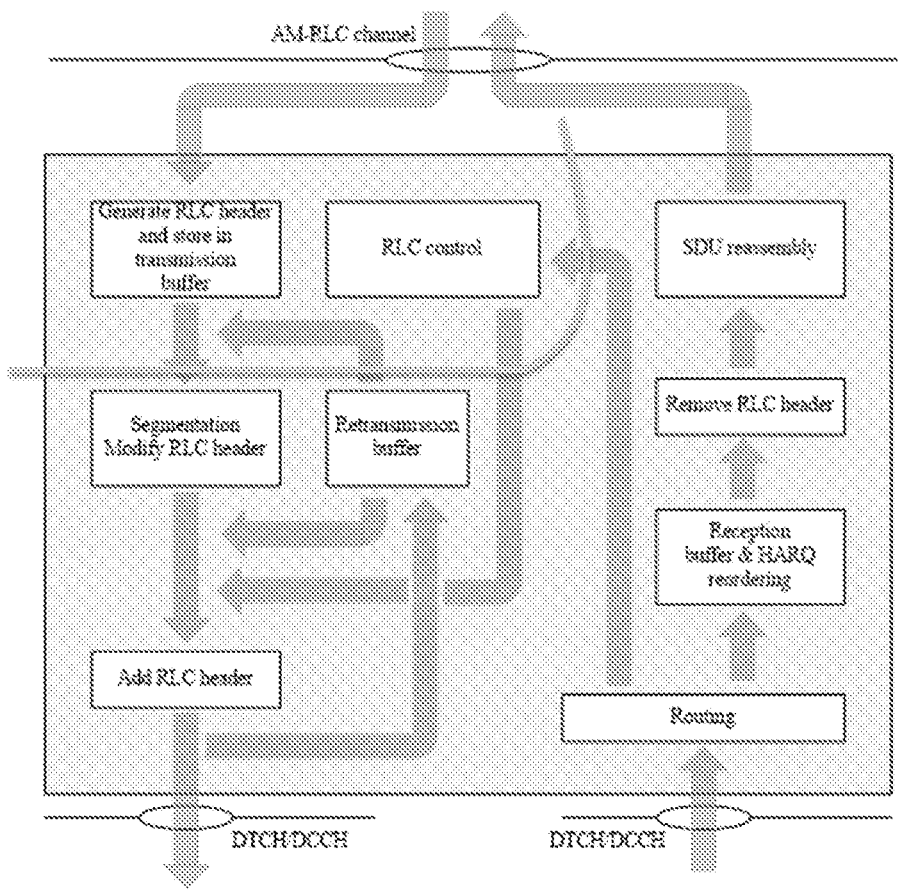
FIG. 13 is a schematic diagram illustrating yet another aspect of the RLC spit according to some embodiments of the present disclosure.

In some embodiments, user plane changes for an RLC split may include one or more of the following, as shown in FIG. 13:
  essentially the only change made is that the central unit (CU) now attaches the RLC header, and handles retransmission of RLC packets;
  the distributed unit (DU) performs segmentation and modification of the RLC header;
  in practice, in this environment, it may be better to use unacknowledged mode (UM) for RLC and have the packet data convergence protocol (PDCP) handle retransmission; and/or
  no coordination is required to perform segmentation or modify the RLC header.

PUCCH Coordination

With distributed CA scheduling, there are potentially two different 'schedulers' (e.g., scheduler node 16a or scheduler node 16b) sending PDCCH grants to the WD 22. Thus, it may be considered important that the acknowledgements/non-acknowledgments (ACK/NACKs) for the different transmissions (e.g., ACK/NACKs sent in UL for the DL transmissions in Pcell 18a and/or Escell 18b) work well together. Thus, some embodiments of the present disclosure provide for PUCCH coordination.

Generally, a scheduler node 16 has at least three fields under its control:
  Downlink assignment index (DAI)—a 2 bit field as defined in Subclause 9.1.3 of Technical Specification (TS) 38.213, as counter DAI;
  PUCCH resource indicator—a 3 bit field, as defined in Subclause 9.2.3 of TS 38.213; and
  PDSCH-to-HARQ_feedback timing indicator—(i.e., k1) 3 bit field as defined in Subclause 9.2.3 of TS 38.213.

In addition, the WD 22 may be configured with up to 4 PUCCH resource sets based on the UCI size. That being said, standards restrictions for PUCCH include the following:
  A WD does not expect to transmit more than one PUCCH with HARQ-ACK information in a slot (Section 9.2.3 of TS 38.213).
  When multiple grants apply to the same ACK/NACK TTI then the last one defines the PUCCH resource indicator field.
  This defines one of up to 8 different PUCCH-Config.
  ACK/NACK are indexed in ascending order across serving cell indexes and PDCCH monitoring indexes (i.e., all one cell, then all the other cell, then all the next cell . . . , etc.).
  The receiver (e.g., UL radio receiver) must be aware of the number of UCI in the cell, and the mapping to make sense of it.

In addition, there are standards restrictions for type-1 HARQ-ACK codebook in the PUSCH as well as type-1 HARQ-ACK codebook (see section 9.1.2.2 and 9.1.3 in TS 38.213), which may also require that the receiver be aware of the number of UCI in the cell and the mapping in order to make sense of the ACK/NACKs. Unfortunately, with distributed CA scheduling, mapping ACK/NACKs to the different transmissions in Pcell 18a and/or Escell 18b may be difficult to coordinate efficiently and clearly. Thus, some embodiments of the present disclosure provide solutions.

Figure 14:
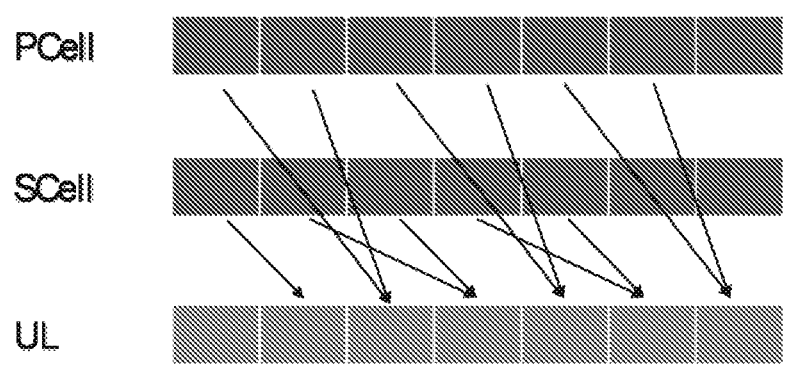
FIG. 14 is a schematic diagram illustrating an example of orthogonal UCI in FDD according to some embodiments of the present disclosure.

According to one embodiment of the present disclosure, using orthogonal UCI is proposed as a solution. Having the PUCCH resources be orthogonal according to techniques provided in the present disclosure, can ensure that the ACK/NACKs for the different scheduler nodes 16 do not collide with each other. For example, in NR the ACK/NACKs for transmissions in different serving cells 18 can occupy different subframes, as shown, for example, in FIG. 14. FIG. 14 illustrates an example of orthogonal UCI in Frequency Division Duplex (FDD) where, for example, the even subframes are for one serving cell, and the odd subframes for another serving cell. FIG. 14 illustrates a row of UL subframes where the WD 22 can send UCI with ACK/NACKs and, as indicated by the arrows in FIG. 14, the even UL subframes are dedicated for ACK/NACKs for e.g., DL transmissions received via Scell (e.g., serving cell 18b) and odd UL subframes are dedicated for ACK/NACKs for e.g., DL transmissions received via Pcell (e.g., serving cell 18a). Accordingly, an UL receiver (e.g., communication interface 62) of scheduler node 16 can map the received UCI to the corresponding serving cell 18a or 18b since the ACK/NACKs for the different scheduler nodes 16a and 16b do not collide with each other. The UL receiver (e.g., communication interface 62) may be considered the decoder of UL data. In some embodiments, the UL receiver may be co-located with the DL encoder and the scheduler. In other embodiments, such elements may be implemented as remote from one another (e.g., separated by backhaul).

In some embodiments, orthogonal UCI may be implemented with or without pre-data transfer or store/decode later embodiments. However, combined together these features may further improve performance as compared to implementations without such features.

If the two schedulers (e.g., scheduler nodes 16a and 16b) are operating on orthogonal UL resources then the schedulers can act independently from a PUCCH perspective. But if both schedulers (e.g., scheduler nodes 16a and 16b) are sending data from the same buffer this 'links' the two schedulers together. With pre-data transfer a dependence/relation/link may be broken (on a slot to slot basis) and the two schedulers can operate independently assuming that the data transfer is operating correctly and that the results of the UCI information (i.e., the HARQ_feedback) is sent separately.

Further, the two schedulers (e.g., scheduler nodes 16a and 16b) are also linked together or dependent on one another in another manner. The UCI UL receiver should know what information it is expecting to receive. This dependency cannot be removed altogether, but by using the store/decode later techniques disclosed herein, the impact of learning about the information latter may be reduced.

According to another embodiment of the present disclosure, a buffered reception technique is proposed as yet another solution. The buffered reception may soften the need for backhaul signals to always arrive on time. For example, this may be performed by buffering the received PUCCH/PUSCH signals which may contain UCI triggered by a remote cell (e.g., Escell 18b). Once messages are received from the remote cell, the PUCCH/PUSCH decoding can proceed as normal.

For example, in one embodiment, scheduler node 16a receives, such as via communication interface 62, data via a physical uplink channel, the physical uplink channel including UCI; scheduler node 16a determines whether the UCI is triggered by a remote scheduler node 16b, the remote scheduler node 16b configured to perform scheduling for the WD 22 in a second cell 18b; in response to determining that the UCI is triggered by the second scheduler node 16b, scheduler node 16a demodulates and stores the received data in a buffer (e.g., memory 68); and, in response to receiving an indication of a number of bits in the UCI from the second scheduler node 16b, scheduler node 16a retrieves the data from the buffer and then decodes the data using the indication. Because the buffered information has already been demodulated, the total buffer size does not need to be very large for the small storage times considered.

Some embodiments of the present disclosure may be implemented in one or more of at least three main devices or components, including Pcell scheduler (e.g., scheduler node 16a), Scell scheduler (e.g., scheduler node 16b), and UL receiver (e.g., communication interface 62). In some embodiments, the Pcell scheduler is configured to make DL and UL scheduling decisions for the Pcell 18a. In some embodiments, Scell scheduler is configured to make DL scheduling decisions for the Scell 18b. In some embodiments, the UL receiver (e.g., communication interface 62) is configured to receive all UL communications from the WD 22.

Scheduling Components
PDSCH and PDCCH

In some embodiments, both cells' schedulers (scheduler node 16a and scheduler node 16b) schedule the PDSCH and PDCCH resources, independently. After scheduling, the remote scheduler node 16b indicates the UCI resources to the UL receiver.

PUSCH

In some embodiments, PUSCH may be scheduled by only one cell's scheduler node (e.g., scheduler node 16a), with channel quality indicator (CQI) requests long-term configured by the remote scheduler node 16b.

Link Adaptation for UCI considers 'worst case' (or similar) environment for UCI (ACK/NACK) from the other cell(s), i.e. the scheduler is usually conservative when selecting the modulation and coding scheme (MCS) assuming a worse case or similar environment in the other cell(s). For PUSCH, there may be at least three different options for scheduling, as follows:

Option 1: PUSCH is only scheduled in slots (or other time resources) 'belonging' to the Pcell 18a, e.g., at most half the time in the FDD example where odd verses even slots are used for each cell as discussed above in the embodiments for orthogonal UCI resources.

Option 2: PUSCH can be scheduled in any slot but UCI information must be available before reception.

Option 3: PUSCH can be scheduled in any slot but is stored (after demodulation) and only decoded after UCI reception (as in the case with for example the buffered reception/store-and-decode later embodiment discussed above).

PUCCH

The resource assignment for PUCCH are agreed long term for particular WDs 22; thus, both scheduler nodes 16a and 16b for cells 18a and 18b, respectively agree on the PUCCH resource indicator (which is the 3 bit index for selecting 1 of multiple RRC-configured PUCCH resource sets).

In some embodiments, the standards enhancement would allow for a 'don't change' option to allow one cell's scheduler not to control the resources utilized. In this embodiment, a new interpretation may be allowed in the standard which states that a particular value in the DCI (001 for instance) does not impact the location of the PUCCH if the PUCCH location is indicated by another DCI in the same transmission time interval (TTI), or conversely, via radio resource signaling (RRC) signaling, this field in the PDCCH can be removed completely with the implicit restriction that another cell will grant resources to provide the correct resources.

The number of UCI (i.e., ACK/NACK) bits are dynamically indicated form the remote scheduler node 16b to the UL receiver (e.g., communication interface 62 of scheduler node 16a).

As an enhancement, in some embodiments, the users selected could be preemptively guessed or determined. This predetermination may be based, for example, on a buffer splitting decision, in which the Pcell will decide using heuristics what is the maximum data that can be sent each Scell/Node. This information can be used to improve the DAI assignments and the number of UCI bits allocated. For instance, if because of buffer splitting it is known that the PCell will not schedule this information can be used to aid in the DAI and UCI calculation.

Example Scheduling Process for Distributed Schedulers

Figure 15:
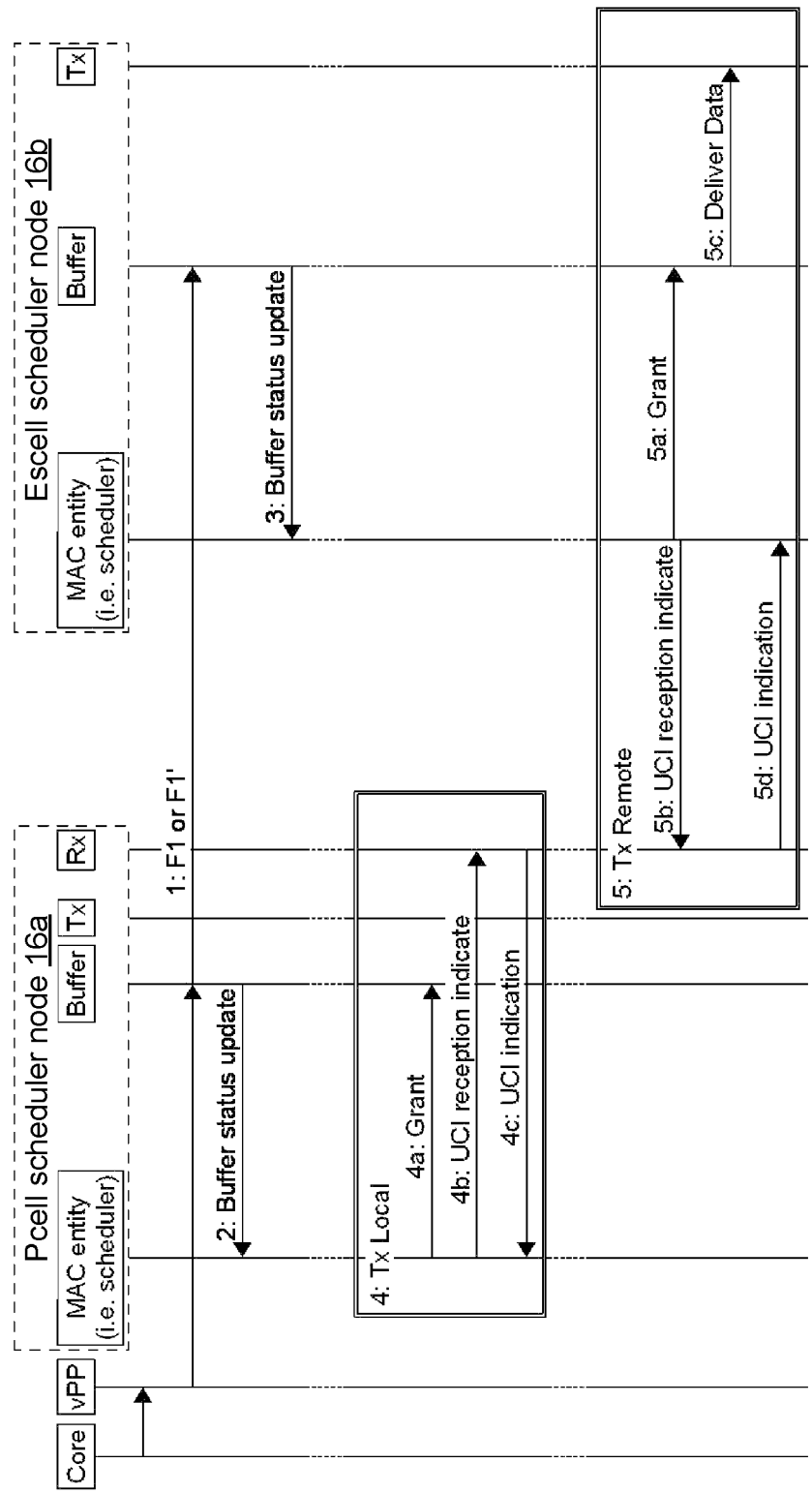
FIG. 15 is a flow diagram for an example scheduling process for distributed CA schedulers according to some embodiments of the present disclosure.

Referring to FIG. 15, a flow diagram for an example scheduling process for distributed CA schedulers is shown according to some embodiments of the present disclosure.

In the example shown, scheduler node 16a for Pcell 18a is shown with a MAC entity scheduler (which may be implemented in the processing circuitry 64 and/or may include scheduling software executed by the processor 66), a buffer (which may be memory 68 at the scheduler node 16a or external memory accessible by the scheduler node

16*a*), a transmitter (Tx) and a receiver (Rx) (which may correspond to communication interface 62 of scheduler node 16*a*). In some embodiments, the pre-data transfer unit 32 and/or the storage determination unit 36 may be implemented in the MAC entity scheduler for node 16*a*.

Scheduler node 16*b* for Escell 18*b* is shown also with a MAC entity scheduler (which may be implemented in the processing circuitry 84 and/or may include scheduling software executed by the processor 86), a buffer (which may be memory 88 at the scheduler node 16*b* or external memory accessible by the scheduler node 16*b*), a transmitter (Tx) (which may correspond to communication interface 82 of scheduler node 16*b*). In some embodiments, the scheduling determination unit 34 may be implemented in the MAC entity scheduler for node 16*b*.

The process may begin with data for a WD 22 (e.g., data to be scheduled for DL to the WD 22 in Escell 18*b*) becoming available at the Pcell scheduler node 16*a* buffer and/or the Escell scheduler node 16*b* buffer. In step 1 of the example process a protocol data unit (PDU) (F1 and/or F1') is delivered to the buffers at respective scheduler nodes 16 and/or 16*b*. The PDU may have a partially formed RLC header, if, for example, the RLC split discussed herein is implemented.

In steps 2 and 3 of the example process, the buffers may indicate to the respective MAC scheduling entities the buffer status at the respective scheduling node. Such indication(s) may be performed periodically or may be interrupt-based.

In step 4, the MAC entity scheduler for scheduler node 16*a* handles the data locally. In step 4*a*, the MAC scheduler entity determines that a WD 22 should receive a PDSCH and sends a grant message to the buffer to package data appropriately and deliver the packaged data to the correct Tx for processing and transmitting. In step 4*b*, the MAC scheduling entity sends a UCI reception indicate message to the Rx to prepare the Rx to receive any indicated UCI (i.e., ACK/NACK for the PDSCH) either on the PUCCH or on the PUSCH. In step 4*c*, the Rx receives UCI and sends a UCI indication to the MAC entity scheduler.

In step 5, the MAC entity scheduler for remote scheduler node 16*b* handles the data. In step 5*a*, the MAC scheduler entity determines that a WD 22 should receive a PDSCH in the Escell 18*b* and sends a grant message to the buffer to package data appropriately and deliver the packaged data to the correct Tx for processing and transmitting. In step 5*b*, the MAC scheduling entity of remote node 16*b* sends a UCI reception indicate message to the Rx of node 16*a* to prepare the Rx to receive any indicated UCI (i.e., ACK/NACK for the PDSCH) either on the PUCCH or on the PUSCH. The UCI reception indicate message may include information about a DL grant sent to the WD 22 by the remote node 16*b* (e.g., which may be used to determine UCI or UCI size). Such information may include information such as, for example, radio link control (RLC)/packet data convergence protocol (PDCP) sequence numbers sent, the transport block size (TBS) size, modulation and coding scheme (MCS), precoding information, etc. In other embodiments, the UCI reception indicate message may include an indication of a number of bits. In some embodiments, the UCI reception indicate message may be reported for several slots together (e.g., UCI information for the last 10 slots), or the information could be indicated in a cumulative fashion (e.g., bits up to 1000 were sent). In some embodiments, the message could include all information included in the downlink control information (DCI) (e.g., sent to WD 22 by remote node 16*b*). In some embodiments, the message could be formatted as DCI. In other embodiments, the message may be a radio link control (RLC) status message and/or may be formatted as an RLC status message. In yet other embodiments, the message could include other information and be formatted in other ways.

In step 5*c*, the buffer delivers the packaged data to Tx for processing and transmitting. The Rx for scheduler node 16*a* for Pcell 18*a* may be the only UL receiver for uplink data from the WD 22. Thus, messages 5*b* and 5*d* between remote scheduler node 16*b* and Rx at scheduler node 16*a* may be communicated via the backhaul link 24. For remote scheduling, the issues may be similar to handling data locally at node 16*a*; however, the UCI reception may be prescheduled to deal with backhaul delays. In step 5*d*, the Rx receives UCI and responds by sending a UCI indication to the MAC entity scheduler of remote scheduler node 16*b* e.g., over the backhaul link 24.

UCI on PUSCH

In a scenario where the WD 22 receives a grant for PUSCH, if the Rx does not know the expected number of UCI bits, the rate matching used can be incorrect. This will cause a complete failure of decoding.

To enable correct rate matching during decoding, the UCI bits should be known. This can be ensured by at least different options: 1) ensuring that all scheduling decisions are made available to the Rx before reception; or 2) delaying decoding of PUSCH until the UCI bits are indicated (e.g., store-and-decode-later embodiment).

Because there is naturally some time offset between a grant sent on the PDCCH and the corresponding PUSCH (i.e., K1), there is some delay 'for free' on the Transport Network Layer (TNL). It generally depends on many configurations but the smallest K1 supported in the specification is roughly 1.5 ms. As long as the communication is less than that for the UCI indication message, UCI mismatch should not occur. On the other hand, if the delay is greater than this 'prescheduling' at the remote scheduler node 16*b* may be used in order to ensure that the message can be received in time.

In this solution where decoding of PUSCH is delayed until the UCI bits are indicated, the PUSCH for WDs 22 (which may have UCI bits triggered by other nodes, such as remote scheduler node 16*b*) may be buffered, until the correct data is made available to properly rate match and decode the PUSCH. To store this PUSCH information requires at most (practically much less), the peak data rate of the UL cell 18*a* over the maximum acceptable delay. As an example, using some example calculations, if up to 10 ms of delay are allowed, for a 20 MHz channel, with each sample requiring 16 bits, there should be roughly 8 Mb of memory for such storage, according to: 20 MHz*Peak Spectral Efficiency bps/Hz*0.01 s*16 bits/sample=8 Mb of memory.

UCI on PUCCH

Similar to UCI on PUSCH, if UCI is granted and sent on PUCCH, in order to decode the PUCCH the UCI sent by the WD 22 should be known. Similar to the PUSCH there are several options for handling UCI on PUCCH, as follows.

1) Perform PUCCH Decoding at the Scheduler Node that Knows the UCI Information

If the PUCCH is orthogonalized (i.e., use alternate TTIs for each cell as discussed herein above) then the PUCCH information can be directly sent to the remote scheduler node (e.g., scheduler node 16*b*) when the PUCCH information is received. The PUCCH resources can be demodulated and the processed traffic can be sent onwards e.g., to the remote node(s). Thus, no UCI information is needed at the receiver, e.g., the UL receiver.

Assuming four resource blocks (RBs) worth of PUCCH, and that all WDs 22 are configured with identical reference signal (RS) patterns, the overhead for this scheme can be roughly determined according to:

sequences*num bits/sample*num RBs/ s=9*16*8000=1.1 Mbps.

2) Perform PUCCH Decoding with Full UCI Formatting Knowledge at Reception

In this approach, it is assumed that the 5b message in FIG. 15 (UCI reception indicate) is always available, and some prescheduling may be used in order to achieve this. After decoding by the UL Rx, the UCI is sent to the remote scheduler node 16b.

3) Perform Delayed PUCCH Decoding, when Full UCI Formatting Becomes Available

In this approach, the PUCCH reception information is stored in a buffer and decoded when then UCI format become available e.g., to the UL Rx. No prescheduling is used by delayed 5b messages added to the total RTT of HARQ messages.

PUSCH Options

Option 1: PUSCH is only scheduled in slots 'belonging' to Pcell. (i.e. at most half the time)

This limits the number of scheduling instances by half, and can have significant impact to peak data rates.

Option 2: PUSCH can be scheduled in any slot but UCI information must be available before reception.

Option 3: PUSCH can be scheduled in any slot but is stored (after demodulation) and only decoded after 5b reception.

Impacts of TNL Delay

If the communication between scheduler node 16a and scheduler node 16b has high latency, at least two signals are impacted with the scheduler loop. One impacted signal is the message 5b, which indicates which UCI resources to measure on.

In situations where the PUCCH resources are used, this measurement can be performed without explicit indication (i.e., the receiver measures the PUCCH whether there are users there or not); thus, message 5b is not required for decoding only for interpretation. If the interpretation is performed in remote scheduler node 16b, then the 5b message is not required.

If the 5b message is required, then the 5b message must be received and processed before the UL transmission occurs. Thus, as long as the TNL latency is less than K1 no performance impact is felt. On the other hand, if the TNL latency is greater than K1 then prescheduling may be used. The amount of prescheduling may be 'latency—K1'.

The second signal impacted is the 5d message (i.e., the ACK/NACK (or CQI) signaling). Any latency experienced by this signal impacts the HARQ process knowledge that remote scheduler node 16b has. The remote scheduler node 16b can react to the actual latency involved and may not need to preschedule for this event.

Impacts of Latency

FIG. 16 is a table illustrating an example impact of latency, e.g., backhaul latency, involved the distributed CA scheduling. The buffer maintenance algorithm may be impacted by communication latency, similar to the 'resource balancing' algorithm of X2 based CA. If PUCCH decoding is handled at remote scheduler node 16b then the 5b message may not be needed and no-prescheduling is performed. Latency may impact the HARQ RTT which HARQ is in the 5d message. This impact may be based on the average (not worst case, or 99 percentile) delay experienced.

PDCCH Alignment, Downlink Assignment Index (DAI) and Total DAI (TDAI)

If the lower band is not FDD, or TDD with multiple UL slots then making the UL resources orthogonal may be problematic. Solutions may be considered for ways for the DAI to be calculated independently. Several options may be considered, as follows. In one embodiment, the scheduler node 16a or 16b may always assume that the other cell is scheduled in every slot. Thus, the TDAI counter may be increased/incremented assuming that the other cell always transmits (e.g., transmits in every slot). The DAI counter may also be increased/incremented as well, assuming that the other cell is always transmitting (e.g., transmit in every slot). In terms of performance, given for example two cells with 10 and 50% activity, about 50% more PUCCH resources are utilized, as compared to existing techniques. Those resources which have known values can be recovered by a forward error correction (FEC) decoder using apriori knowledge.

Accordingly, the present disclosure proposes one or more techniques to solve the problems of e.g., scheduling in distributed scheduler nodes for CA and/or backhaul delays associated therewith. Some embodiments may include one or more of the following features:

Use of orthogonal resources (e.g., different transmission time intervals (TTIs) for each scheduler node);

Store and decode later/buffered reception (e.g., store UL data received at a node via e.g., a Pcell, where the data is to be decoded at a later time, such as, when additional information required for decoding arrives at the node); and/or Send copies of data (e.g., data to be scheduled, such as, in the DL, by a remote node) to the remote node ahead of the remote node's scheduling decisions.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first scheduler node of a first cell configured to communicate with a second scheduler node of a second cell, the first scheduler node configured to perform scheduling for a wireless device (WD) in the first cell of a communication system with carrier aggregation, the first scheduler node comprising processing circuitry, the processing circuitry configured to:
receive data to be scheduled for transmission to the WD in the second cell;
transfer the data to the second scheduler node for scheduling transmission of the data in the second cell; and
as a result of the transfer of the data, receive a scheduling decision from the second scheduler node, the received scheduling decision scheduling the transmission of at least a portion of the data to the WD in at least one physical downlink channel in the second cell.

2. The first scheduler node of claim 1, wherein the processing circuitry is further configured to receive the scheduling decision by being configured to receive the scheduling decision after the transfer of the data to the second scheduler node.

3. The first scheduler node of claim 1, wherein the processing circuitry is further configured to receive the scheduling decision by being configured to receive the scheduling decision as a result of the transfer of the data to the second scheduler node.

4. The first scheduler node of claim 1, wherein the at least one downlink channel is configured according to the scheduling decision of the second scheduler node.

5. The first scheduler node of claim 1, wherein the at least one physical downlink channel is a physical downlink shared channel (PDSCH).

6. The first scheduler node of claim 1, wherein the scheduling decision includes scheduling information for the at least one downlink channel in the second cell, the scheduling information including downlink control information (DCI).

7. The first scheduler node of claim 1, wherein the first scheduler node is configured to communicate with the second scheduler node via a backhaul link for independent scheduling of the WD in carrier aggregation mode with coordinated uplink control information (UCI).

8. The first scheduler node of claim 1, wherein the processing circuitry is further configured to transfer the data by being configured to transfer the data from the first scheduler node to the second scheduler node via a backhaul link.

9. The first scheduler node of claim 1, wherein the processing circuitry is further configured to transfer the data by being configured to transfer the data from the first scheduler node to the second scheduler node via an X2 interface.

10. The first scheduler node of claim 1, wherein the second cell is an external cell (Escell) relative to the first cell.

11. The first scheduler node of claim 1, wherein the processing circuitry is further configured to:
receive uplink control information (UCI) on orthogonal UCI resources, the orthogonal UCI resources comprising a first set of UCI resources for the first cell and a second set of UCI resources for the second cell, the first set of UCI resources not overlapping the second set of UCI resources.

12. The first scheduler node of claim 11, wherein each set of UCI resources is a set of non-overlapping subframes.

13. The first scheduler node of claim 1, wherein the first scheduler node and the second scheduler node are Medium Access Control (MAC) schedulers.

14. A method for a first scheduler node of a first cell configured to communicate with a second scheduler node of a second cell, the first scheduler node configured to perform scheduling for a wireless device (WD) in the first cell of a communication system with carrier aggregation, the method comprising:
- receiving data to be scheduled for transmission to the WD in the second cell;
- transferring the data to the second scheduler node for scheduling transmission of the data in the second cell; and
- as a result of the transfer of the data, receiving a scheduling decision from the second scheduler node, the received scheduling decision scheduling the transmission of at least a portion of the data to the WD in at least one physical downlink channel in the second cell.

15. The method of claim 14, wherein the receiving the scheduling decision further comprises receiving the scheduling decision after the transfer of the data to the second scheduler node.

16. The method of claim 14, wherein the receiving the scheduling decision further comprises receiving the scheduling decision as a result of the transfer of the data to the second scheduler node.

17. The method of claim 14, further comprising configuring the at least one downlink channel according to the scheduling decision of the second scheduler node.

18. The method of claim 14, wherein the at least one physical downlink channel is a physical downlink shared channel (PDSCH).

19. The method of claim 14, wherein the scheduling decision includes scheduling information for the at least one downlink channel in the second cell, the scheduling information including downlink control information (DCI).

20. The method of claim 14, wherein the second scheduler node is configured to communicate with the first scheduler node via a backhaul link for independent scheduling of the WD in carrier aggregation mode with coordinated uplink control information (UCI).

* * * * *